(12) United States Patent
Kusunoki et al.

(10) Patent No.: US 6,765,347 B2
(45) Date of Patent: Jul. 20, 2004

(54) DISPLAY DEVICE

(75) Inventors: Toshiaki Kusunoki, Tokorozawa (JP); Masakazu Sagawa, Inagi (JP); Mutsumi Suzuki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 10/222,635

(22) Filed: Aug. 19, 2002

(65) Prior Publication Data

US 2003/0057825 A1 Mar. 27, 2003

(30) Foreign Application Priority Data

Sep. 26, 2001 (JP) ........................................ 2001-292782
Jun. 14, 2002 (JP) ........................................ 2002-173627

(51) Int. Cl.[7] .............................. H01J 1/62; H01J 1/02
(52) U.S. Cl. ...................... 313/498; 313/506; 313/495
(58) Field of Search .............................. 313/495–500, 313/310, 311, 582, 584, 585, 587; 257/752, 758, 761, 769, 10

(56) References Cited

U.S. PATENT DOCUMENTS 5,747,928 A * 5/1998 Shanks et al. ............... 313/498
5,942,767 A * 8/1999 Na et al. ..................... 313/758
6,400,070 B1 * 6/2002 Yamada et al. .............. 313/310

OTHER PUBLICATIONS

N. Koshida, "Light Emission From Porous Silicon—Beyond the Indirect/Direct Transition Regime", *Oyo Buturi*, vol. 66, No. 5, 1997, pp. 437–443.

* cited by examiner

*Primary Examiner*—Ashok Patel
(74) *Attorney, Agent, or Firm*—Miles & Stockbridge P.C.

(57) ABSTRACT

The invention realizes a display device that uses thin film cathodes having no contamination of a top electrode and no damage of an electron acceleration layer due to photo process and having no contact failure of the top electrode of the thin film cathode array due to oxidation or breakage of the bus electrode in the frit glass process that is carried out when a panel is manufactured to bring about the high reliability of the wiring connection of the top electrode. To realize the display device, the invention provides a display device having a substrate comprising a base electrode, a top electrode, and an electron acceleration layer disposed between the base electrode and the top electrode, which substrate is formed of arrayed thin film cathodes that emit electrons from the top electrode side by applying a voltage between the base electrode and the top electrode, and a phosphor screen. The arrayed thin film cathodes have a top bus electrode served as a current feed line to the top electrode, which top bus electrode is tapered so that the film thickness decreases toward an electron emission portion side, and have an overhang structure that separates the top electrode into individual cathodes.

12 Claims, 28 Drawing Sheets

FIG. 27
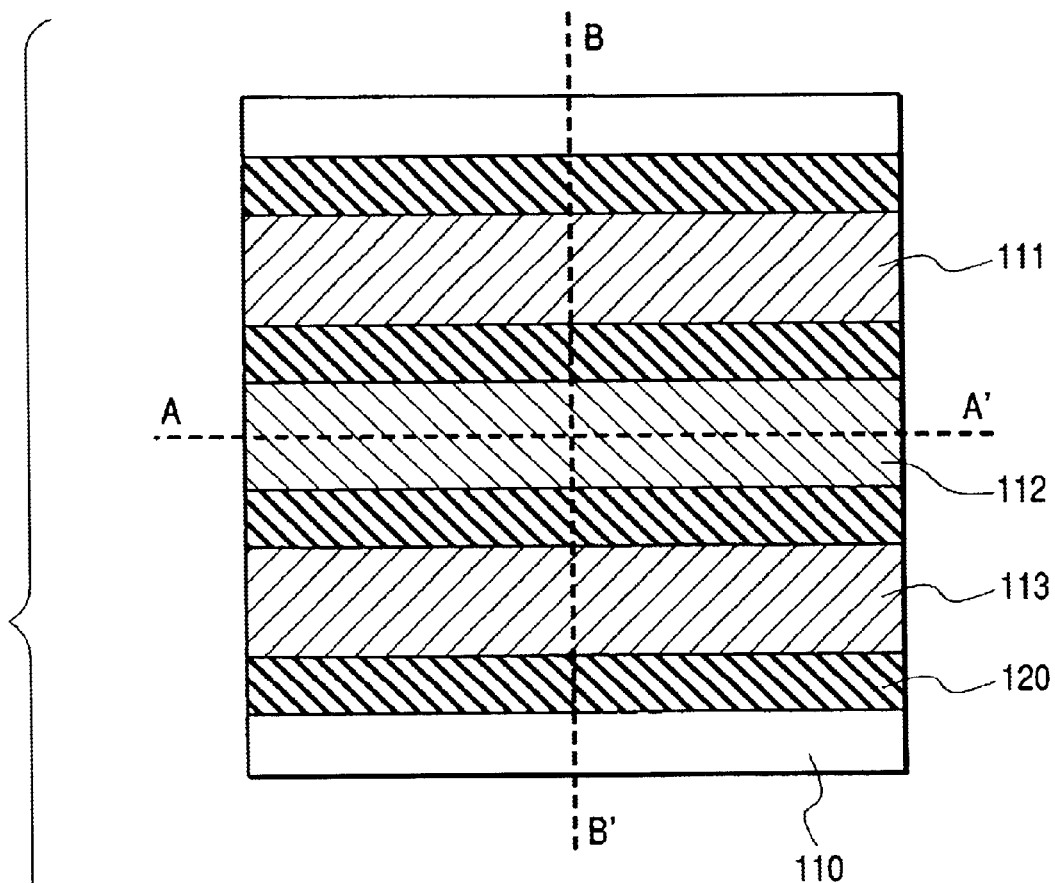
A—A' SECTION
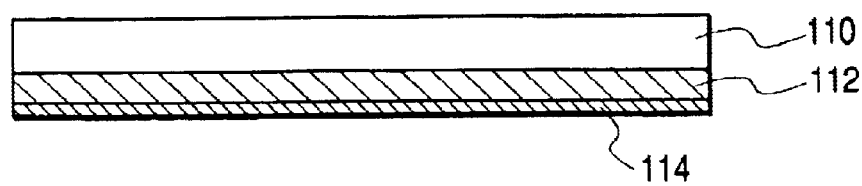
B—B' SECTION
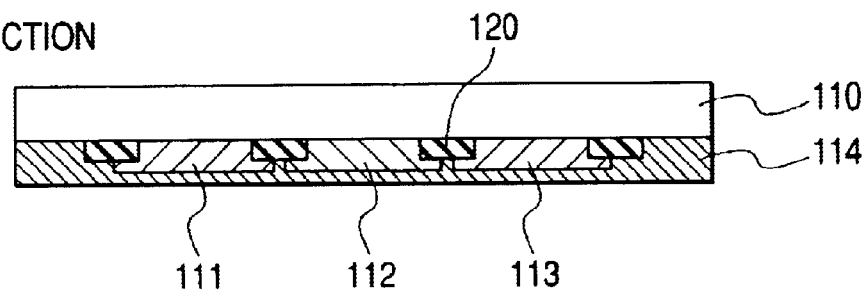

DISPLAY DEVICE

BACKGROUND OF THE INVENTION

1. Field of the Invention

The present invention relates to a display device provided with a substrate formed of arrayed thin film cathodes for emitting electrons from a top electrode side when a voltage is applied between a base electrode and the top electrode, which thin film cathodes comprises the base electrode, the top electrode, and an electron acceleration layer such as insulator held between these electrodes, and provided with a phosphor screen.

2. Description of the Prior Art

Thin film cathode basically has the structure comprising laminated three thin films, namely a top electrode, electron acceleration layer, and base electrode, and a voltage is applied between the top electrode and the base electrode to thereby emit electrons from the surface of the top electrode into the vacuum. For example, a MIM (Metal-Insulator-Metal) type thin film cathode comprising a laminate of a metal, an insulator, and a metal, a MIS (Metal-Insulator-Semiconductor) type thin film cathode comprising a laminate of a metal, an insulator, and a semiconductor, and a thin film cathode comprising a laminate of a metal, an insulator-semiconductor, and a metal are exemplified as the thin film cathode. MIM type (for example, Japanese Patent Laid-open No. Hei07-65710), MIS type of MOS type (J. Vac. Sci. Technol, B11(2) p. 429–432 (1993)), the metal/insulator-semiconductor/metal type of HEED type (high-efficiency-electro-emission-device,Jpn.J.Appl. Phys.,vol. 36, p L939), EL type (Electroluminescence, OYO BUTURI vol. 63, No. 6, p. 592), porous silicone type (OYO BUTURI vol. 66, No. 5, p. 437) have been reported.

The operation mechanism of a MIM type thin film cathode is exemplarily shown in FIG. 2. A driving voltage $V_d$ is applied between the top electrode 13 and the base electrode 11 to form an electric field of approximately 1 to 10 MV/cm in the electron acceleration layer 12. Thereby, electrons in the vicinity of the Fermi level in the base electrode 11 pass through the barrier due to the tunnel phenomenon and are injected into the electron acceleration layer 12 and conduction band of the top electrode 13 as hot electrons. Though hot electrons are scattered in the electron acceleration layer and the top electrode 13 and lose the energy, partial hot electrons having the energy higher than the work function of the top electrode 13 are emitted into the vacuum 20.

Other thin film cathodes accelerate electrons and emit electrons through a thin top electrode 13, that operation is common for all the other thin film cathodes.

A thin film cathode having a matrix structure comprising a plurality of top electrodes and a plurality of base electrodes that are disposed orthogonally each other can generate an electron beam from an arbitrary position, and can be utilized as the electron source of a display device. It has been observed that a MIM (Metal-Insulator-Metal) structure comprising Au—$Al_2O_3$—Al laminate emits electrons.

Because a thin top electrode is used for a thin film cathode array, usually a top bus electrode that is served as the current feed line is added for applying it to a display device. At that time, connection between a top bus electrode and a top electrode is formed very carefully so that the thin top electrode is not broken. To process a thin top electrode without damage of an electron acceleration layer and without contamination of the top electrode with resist, it is effective that an inter layer insulation film having an electron emitting aperture is formed on the top bus electrode and the top electrode is cut into pixel pieces by use of the interlayer insulation film as a mask.

The inventors of the present invention has proposed a method (Japanese Patent laid-open No. 2001-256907) in which, as shown in FIG. 3, a top bus electrode comprises two layers, namely a thin top bus electrode under-layer 16 and a thick bus electrode upper-layer 17, electrical contact is secured by the thin top bus electrode under-layer 16 without breakage of the top electrode 13, the top bus electrode upper-layer 17 is formed so as to support the overhang of the interlayer insulation film 18, and the step formed as the result of the configuration is served to separate the top electrode 13 as the structure of the top bus electrode that satisfies the two conditions. In detail, a thin W film is used as the top bus electrode under-layer 16, a thick Al alloy layer is used as the top bus electrode upper-layer 17, and an $Si_3N_4$ film or $SiO_2$ film is used as the interlayer insulator 18.

When the thin film cathode is applied to a display, a thin film cathode is inevitably subjected to frit glass sealing at a temperature as high as 400° C. or higher for glass bonding to a phosphor screen. The thin film cathode having the conventional structure can be involved in two problems when it is subjected to the high temperature process. At first, one problem is oxidation of a thin top bus electrode under-layer 16.

It is preferable for low cost manufacturing that frit glass sealing is carried out in an atmospheric environment for baking organic binder contained in the frit glass paste and for omitting equipment and process that are necessary for gas replacement. However, the electrode material is oxidized. Even if the high temperature process is carried out in an inert gas atmosphere for preventing oxidation, oxidation of an electrode cannot be prevented due to oxygen contained in the inert gas though the content is very little. The top bus electrode under-layer 16 having the conventional structure is involved in the problem of insufficient oxidation resistance. For example, though W is rather an oxidation resistant material, a W film having a thickness as thin as approximately 10 nm is almost oxidized entirely when it is heated at a temperature of 400° C. or higher to result in increased resistance value of the sheet, and the electric contact with the top electrode 13 becomes poor. On the other hand, though a W film having a thickness as thick as 20 nm or thicker causes suppression of diffusion of oxidation seeds of the surface oxidized film and the oxidation of the whole film is prevented to thereby maintain the low resistance, the step becomes large to reduce the reliability of the electrode connection.

The other problem relates to breaking of a thin top bus electrode under-layer 16 due to thermal stress caused from high temperature treatment for frit glass sealing. The top bus electrode under layer 16 is deformed due to the stress caused from the difference in thermal expansion coefficient between the top bus electrode upper-layer 17 and the interlayer insulation film 18 and due to the stress caused from densification of the top bus electrode upper-layer 17 and the interlayer insulation film 18 when the thin film cathode is subjected to high temperature heat treatment cycle for frit glass sealing. Because the top bus electrode under-layer 16 is very thinner than the top bus electrode upper-layer 17 and interlayer insulator 18, the top bus electrode under-layer is apt to break.

SUMMARY OF THE INVENTION

It is an object of the present invention to provide a thin film cathode that is capable of maintaining high electric contact reliability with a top electrode 13 by preventing oxidation of a top bus electrode under-layer 16, or by preventing lowering of the reliability of electric connection with the top electrode 13 due to a step in the case that a top bus electrode 16 having a thick thickness is used to prevent the oxidation of the top bus electrode under-layer 16, and by preventing the breakage of electric connection with the top bus electrode under-layer 16 due to thermal stress even though the thin film cathode is subjected to high temperature frit glass sealing treatment. Thereby, a highly reliable display device can be realized at a high manufacturing yield.

This object of the present invention is realized by providing a display device having a substrate comprising a base electrode, a top electrode, and an electron acceleration layer disposed between the base electrode and the top electrode, which substrate is formed of arrayed thin film cathodes that emit electrons from the top electrode side by applying a voltage between the base electrode and the top electrode, and a phosphor screen, wherein the arrayed thin film cathodes have a top bus electrode served as a current feed line to the top electrode, which top bus electrode is tapered so that the film thickness decreases toward an electron emission portion side, and have an overhang structure that separates the top electrode into individual cathodes.

The overhang structure comprises a laminate of films consisting of two or more different materials respectively. The top bus electrode and the overhang structure are realized by using a laminate constituted of a first metal layer (top bus electrode), second metal layer, and insulator in the order from the top bus electrode side, or a laminate constituted of a first metal layer (top bus electrode), insulator, and second metal layer in the order from the top bus electrode side, or otherwise a laminate constituted of a first metal layer (top bus electrode), a first insulator, and second insulator in the order from the top bus electrode side.

The top bus electrode and the overhang structure are realized by employing the combination of a material used for the top bus electrode that is etched slowest and a material used for the film of the overhang laminate film disposed on the side of the top bus electrode that is etched fastest with the same etchant is employed for the top bus electrode and the overhang structure or by employing the combination of materials of top bus electrode and the overhang laminate film that are etched selectively.

BRIEF DESCRIPTION OF THE DRAWINGS

FIG. 27 is a diagram showing a phosphor screen substrate that uses a thin film cathode of the present invention;

DETAILED DESCRIPTION OF THE PREFERRED EMBODIMENTS (First Embodiment)

One embodiment of a MIM type thin film cathode having a laminate film that is formed of a top bus electrode and overhang structure comprising a first metal layer (top bus electrode), a second metal layer, and an insulator in the order from the top bus electrode side will be described as the first embodiment of the present invention that realizes the objects.

Figure 4:
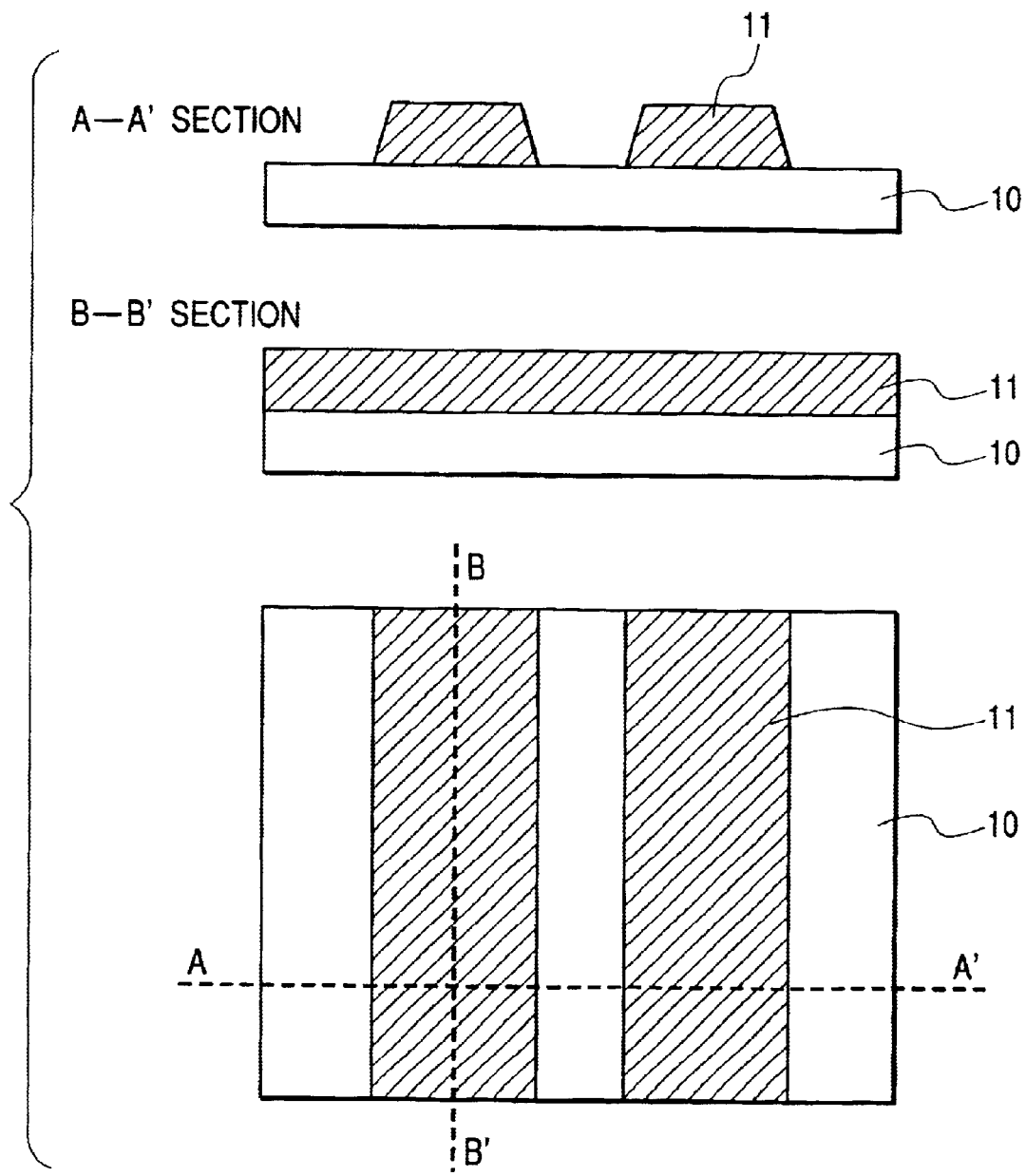
FIG. 4 is a diagram showing the manufacturing process of the thin film cathode of the present invention.

At first, the fabrication process of a thin film cathode will be described with reference to FIG. 4 to FIG. 15. A metal film that is to be served as a bottom electrode is formed on a substrate 10 consisting of insulative material such as glass. Al or Al alloy is used as the bottom electrode material. The reason why Al or Al alloy is used is that an excellent insulation film is formed by means of anodizing. Herein, Al—Nd alloy doped with Nd with a concentration of 2 atomic % is used. The film is formed by means of sputtering technique. The film thickness is 300 nm. Striped base electrode 11 is formed through photo process and etching process after the film has been formed. For example, an aqueous mixture of phosphoric acid, acetic acid, and nitric acid is used for wet etching (FIG. 4).

Figure 5:
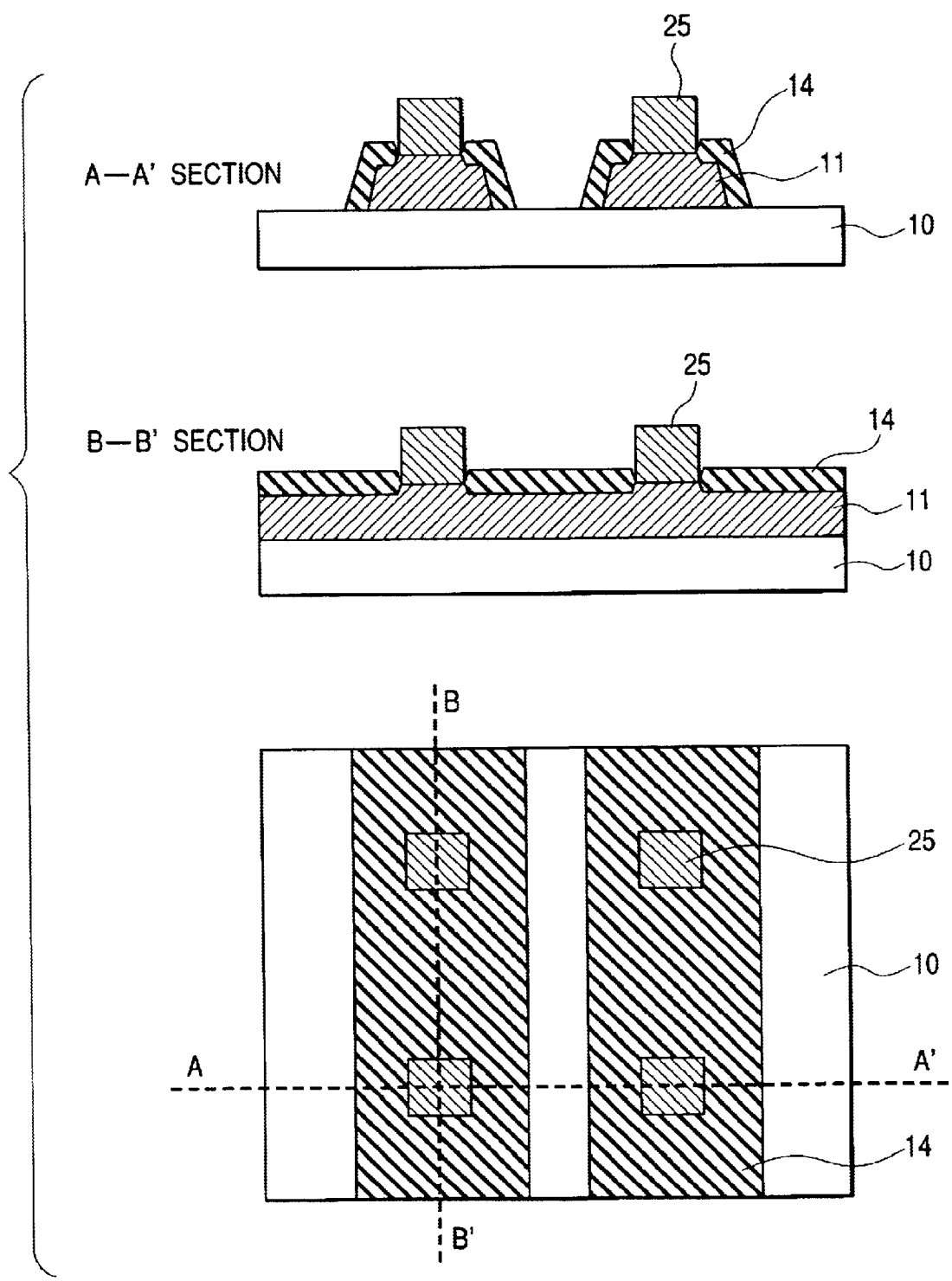
FIG. 5 is a diagram showing the manufacturing process of the thin film cathode of the present invention.

Next, a protective insulator 14 that is served to control an electron emitting portion to thereby prevent electric field to be intensified on the edge of the base electrode and an electron acceleration layer 12 are formed. At first, a portion that is to be an electron emission portion on the bottom electrode 11 is masked with a resist film 25, and unmasked portion is anodized deeply to form the protective insulator 14 (FIG. 5). When an anodizing voltage of 100 V is applied, the protective insulator 14 having a thickness of approximately 136 nm is formed. Next, the resist film 25 is removed, and the surface of the residual base electrode 11 is anodized.

Figure 6:
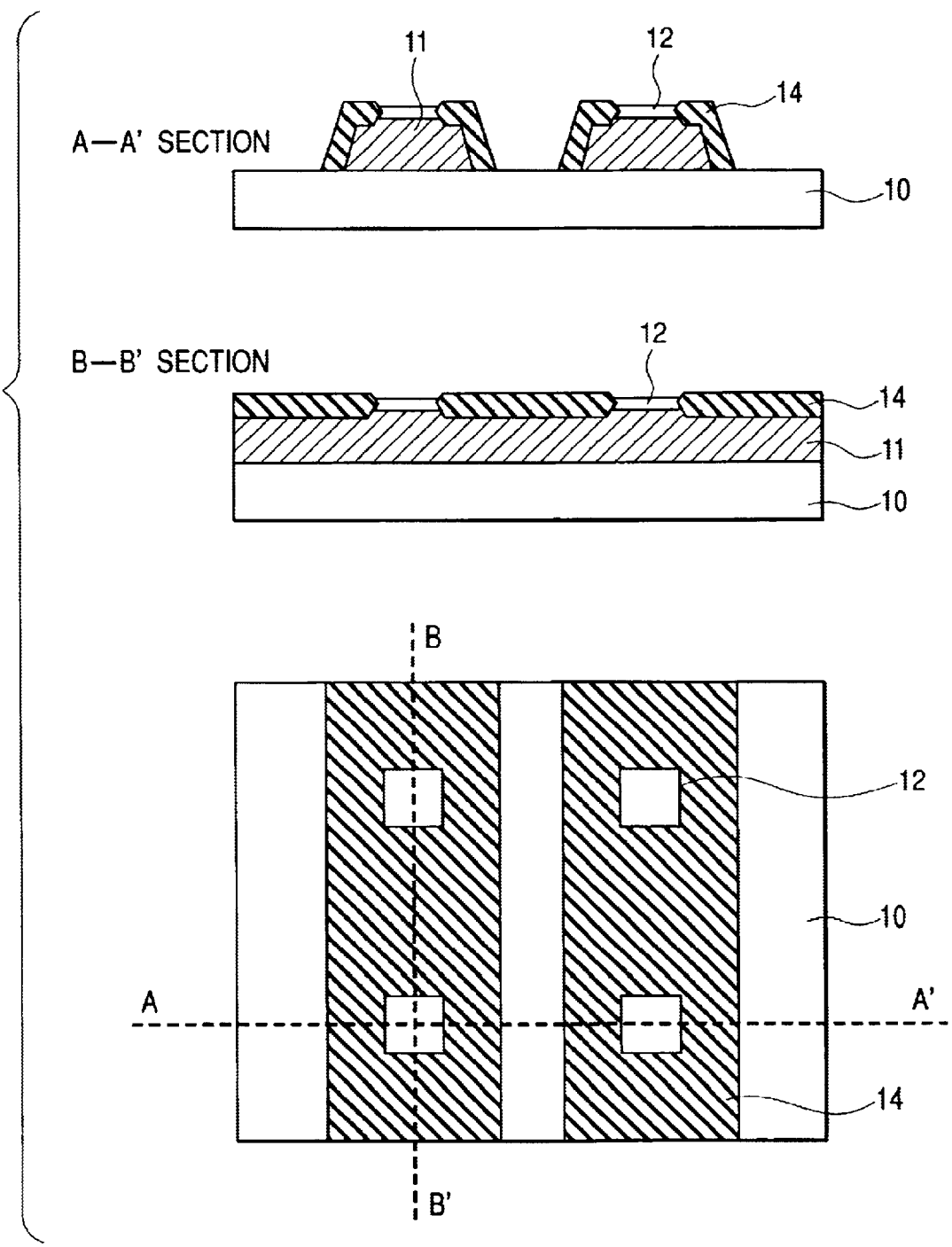
FIG. 6 is a diagram showing the manufacturing process of the thin film cathode of the present invention.

For example, when an anodizing voltage of 6 V is applied, the electron acceleration layer 12 having a thickness of approximately 10 nm is formed on the base electrode 11 (FIG. 6).

Figure 7:
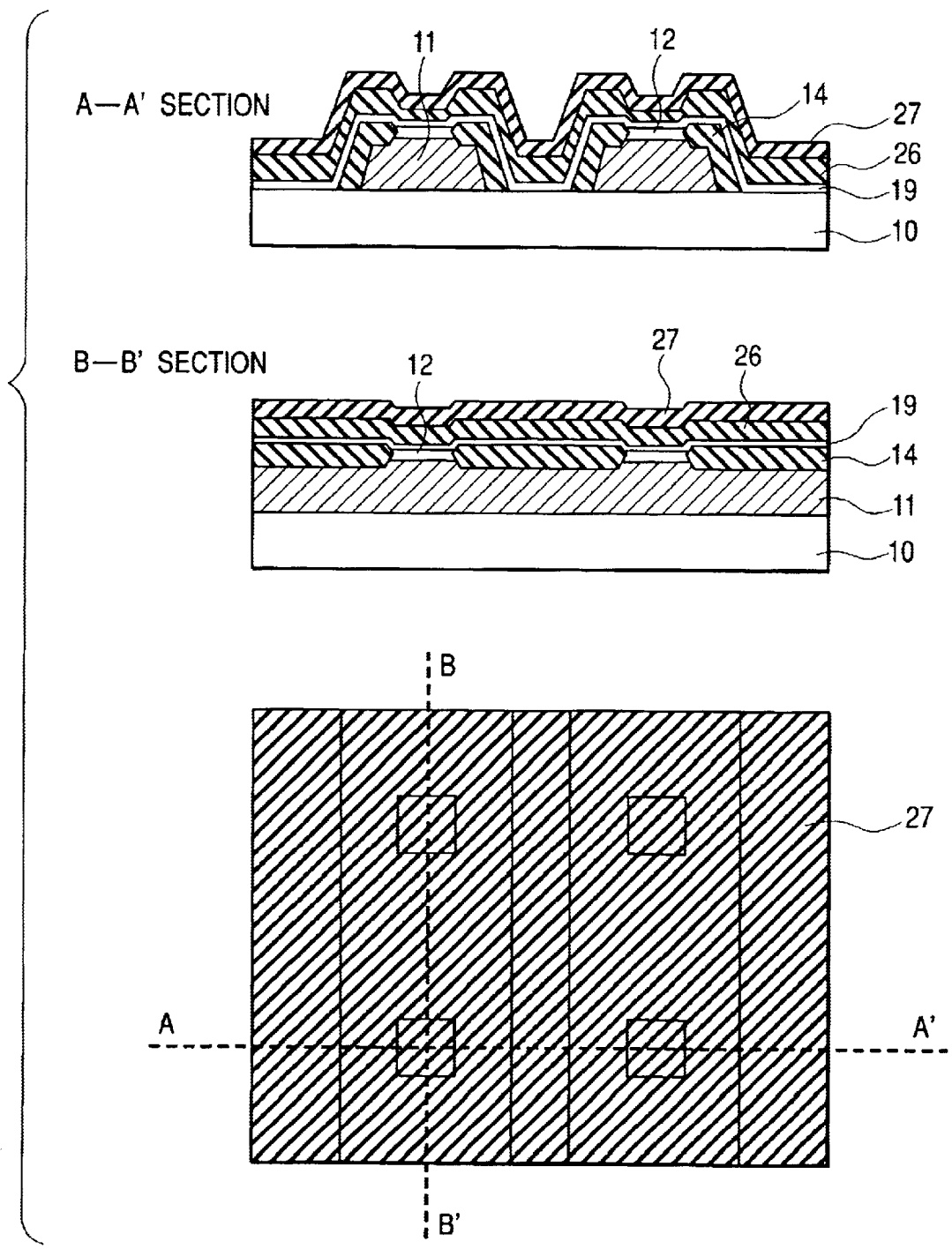
FIG. 7 is a diagram showing the manufacturing process of the thin film cathode of the present invention.

Next, a top bus electrode film that is to be served as a current feed line to the top electrode 13, a second protective insulator 19 formed under the top bus electrode film, a first metal layer (top bus electrode) 26, and a second metal layer 27 are formed by means of, for example, sputtering technique. The second protective insulator 19 is formed of, for example, Si oxide so as to have a thickness of 40 nm. The second protective insulator 19 covers the defect if there are pinholes on the protective insulator 14 that has been formed by means of anodizing to thereby serve as insulator between the base electrode 11 and the top bus electrode. Al—Nd alloy is used as material of the first metal layer (top bus electrode) 26, and Cr is used as material of the second metal layer 27. Otherwise, Cr, or Cr alloy may be used as material of the first metal layer (top bus electrode) 26, and Mo, W, Ti, or Nb may be used as material of the second metal layer 27. The film thickness of the first metal layer (top bus electrode) 26 and the second metal layer 27 is as thick as 300 nm (FIG. 7).

Figure 8:
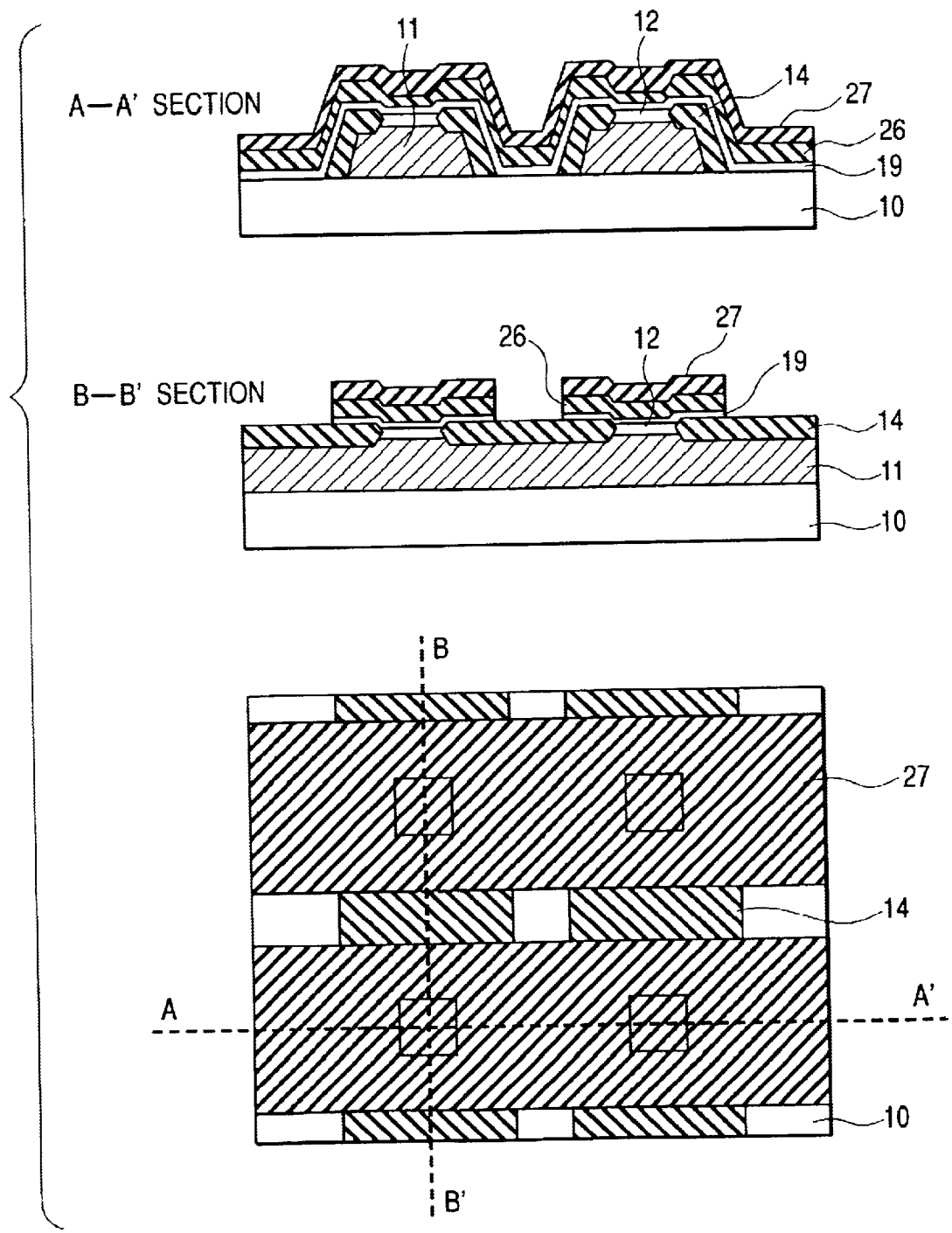
FIG. 8 is a diagram showing the manufacturing process of the thin film cathode of the present invention.
Figure 9:
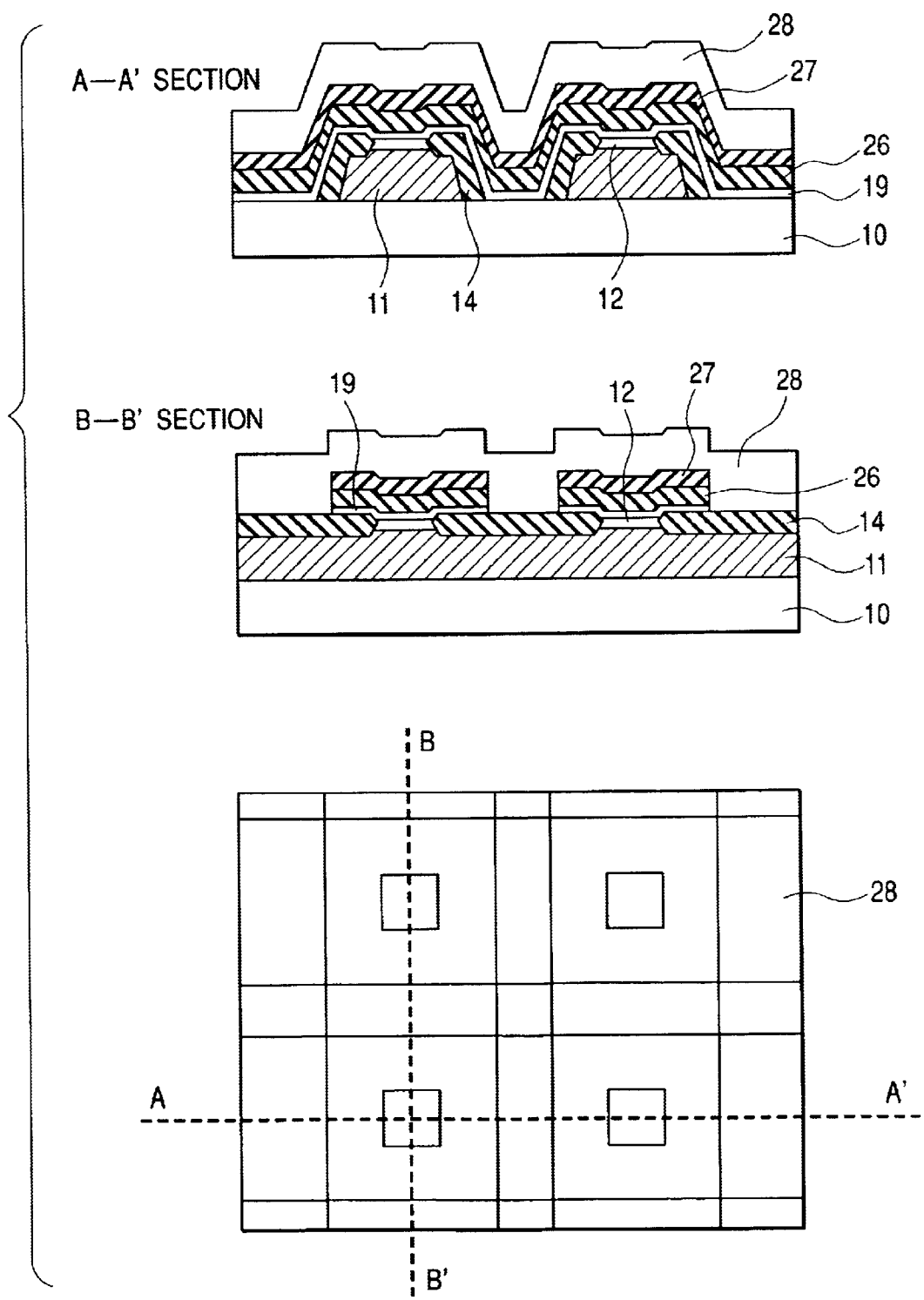
FIG. 9 is a diagram showing the manufacturing process of the thin film cathode of the present invention.

Subsequently, the second metal layer 27 and the first metal layer (top bus electrode) 26 are processed so as to be orthogonal to the base electrode 11 by means of photoetching technique. An aqueous cerium ammonium nitrate solution is used as the etchant for Cr of the second metal layer 27, and an aqueous mixed solution of phosphoric acid, acetic acid, and nitric acid is used for Al—Nd alloy of the first metal layer (top bus electrode) 26 (FIG. 8). Next, an insulator 28 that is to be the upper layer of a laminate film having the overhang structure is formed. For example, $SiO_2$, or $Si_3N_4$ is used for the insulator 28. In this embodiment, a $SiO_2$ film formed by sputtering technique is used. In this embodiment, the thickness of the insulator 28 is 500 nm (FIG. 9).

Figure 10:
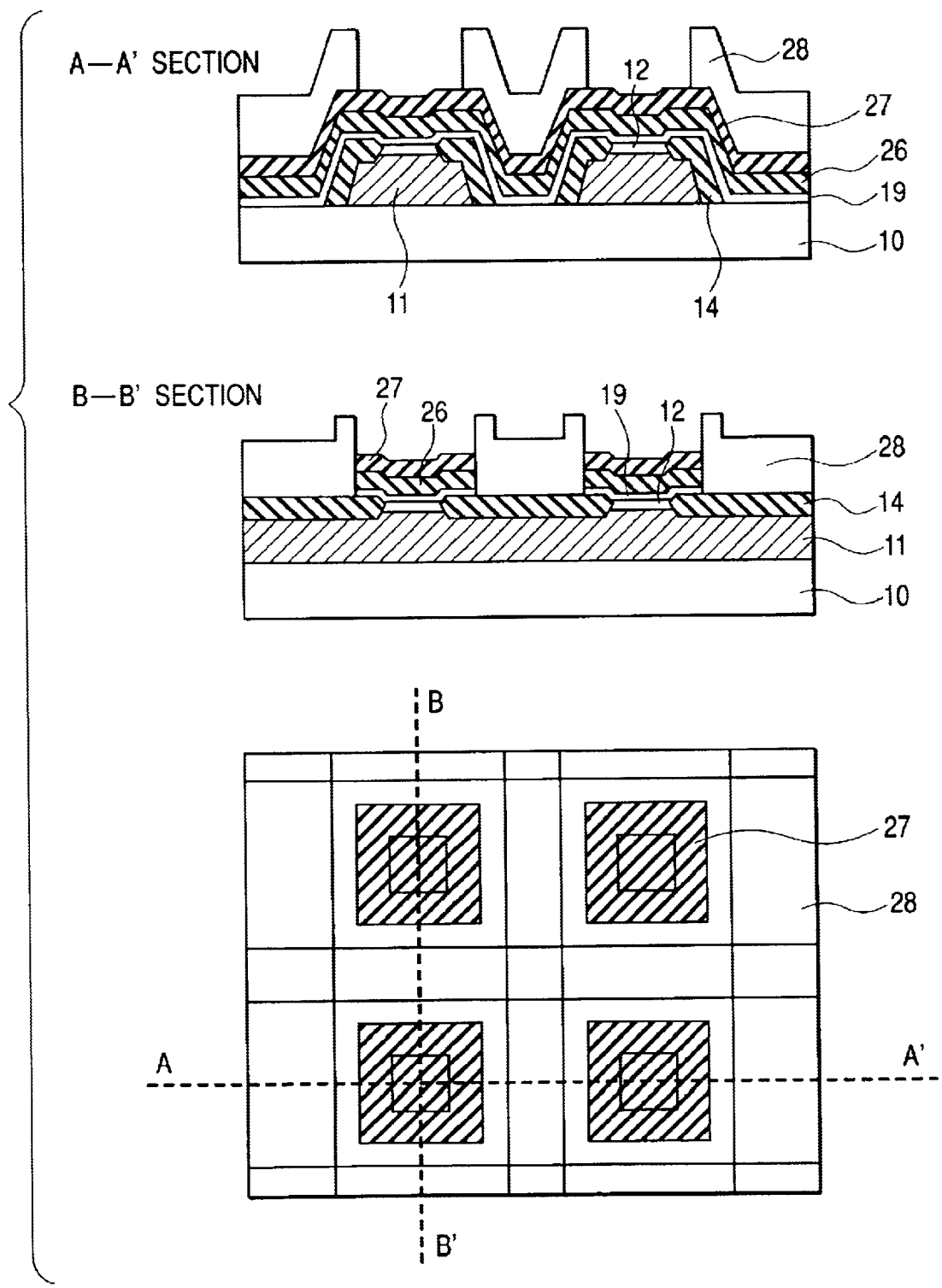
FIG. 10 is a diagram showing the manufacturing process of the thin film cathode of the present invention.
Figure 11:
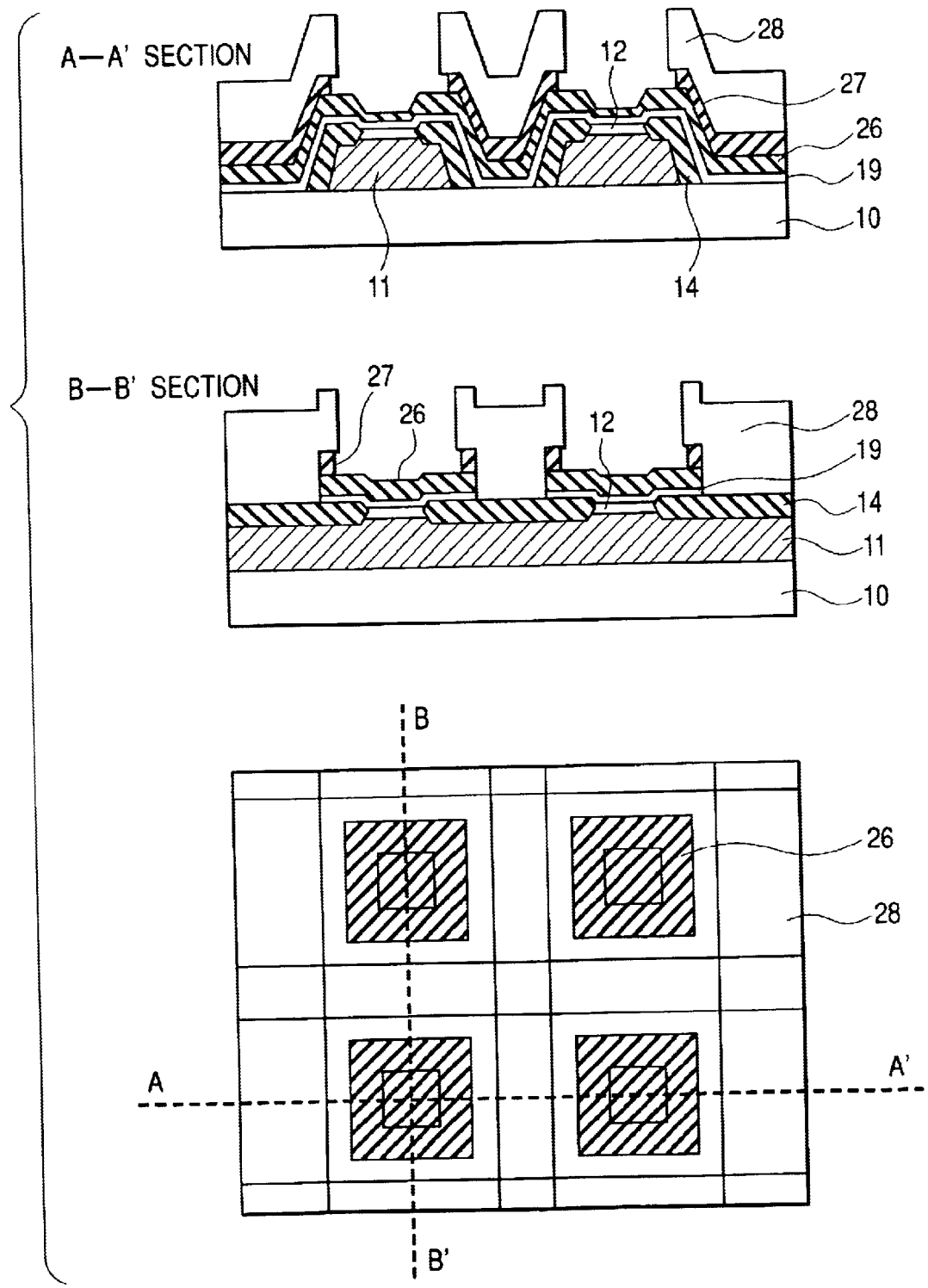
FIG. 11 is a diagram showing the manufacturing process of the thin film cathode of the present invention.

Subsequently, an aperture is formed on the region of the insulator 28 including electron emission portion by means of photoetching technique. For example, dry etching technique by use of $CF_4$ or $SF_6$ may be used for the process. Because the $SiO_2$ film of the insulator 28 is etched highly selectively and Cr of the second metal layer 27 is not etched by means of dry etching by use of fluoride-based etching gas such as $CF_4$ or $SF_6$, it is possible that only the insulator 28 is etched by use of the second metal layer 27 as the stopper film (FIG. 10). A second metal layer 27 consisting of Ti can be processed similarly. The second metal layer 27 consisting of Mo, W, or Nb can be etched by means of dry etching technique by use of fluoride-based etching gas such as $CF_4$ or $SF_6$. At that time, the first metal layer (top bus electrode) 26 consisting of Al—Nb alloy may be served as the stopper film. Subsequently, Cr of the second metal layer 27 of the electron emission portion is subjected to wet etching by use of an aqueous cerium ammonium nitrate solution. The etchant etches Cr but does not etch the $SiO_2$ insulator 28 and the Al—Nd alloy first metal layer (top bus electrode) 26, and the $SiO_2$ second protective insulator 19. Therefore, only the second metal layer 27 is etched at high selection ratio. As the result, the second metal layer 27 is recessed inward with respect to the insulator (interlayer insulator) 28, the overhang aperture of the insulator 28 is formed (FIG. 11). In the case that the second metal layer 27 consists Mo, the under part of the insulator 28 is side-etched to form an overhang by use of an aqueous mixed solution of phosphoric acid, acetic acid, and nitric acid. Mo is etched extremely fast in an aqueous mixed solution of phosphoric acid, acetic acid, and nitric acid in comparison with Al and Al alloy, and only the second metal layer 27 can be etched at high selection ratio. In the case of W or Ti, only the second metal layer 27 can be etched at high selection ratio in an aqueous mixed solution of ammonia and hydrogen peroxide.

Furthermore, because the second metal layer 27 consists of Mo or Nb that is etched faster than the insulator 28 consisting of $SiO_2$ in the case that dry etching technique by use of fluoride-base such as $CF_4$ or $SF_6$ is employed for etching, the dry etching for forming the aperture on the region of the insulator 28 including the electron emission portion is continued sufficiently for over etching, the overhang structure can be thereby formed without combination with wet etching. At that time, the Al—Nd alloy first metal layer (top bus electrode) 26 can be served as the stopper film.

Figure 12:
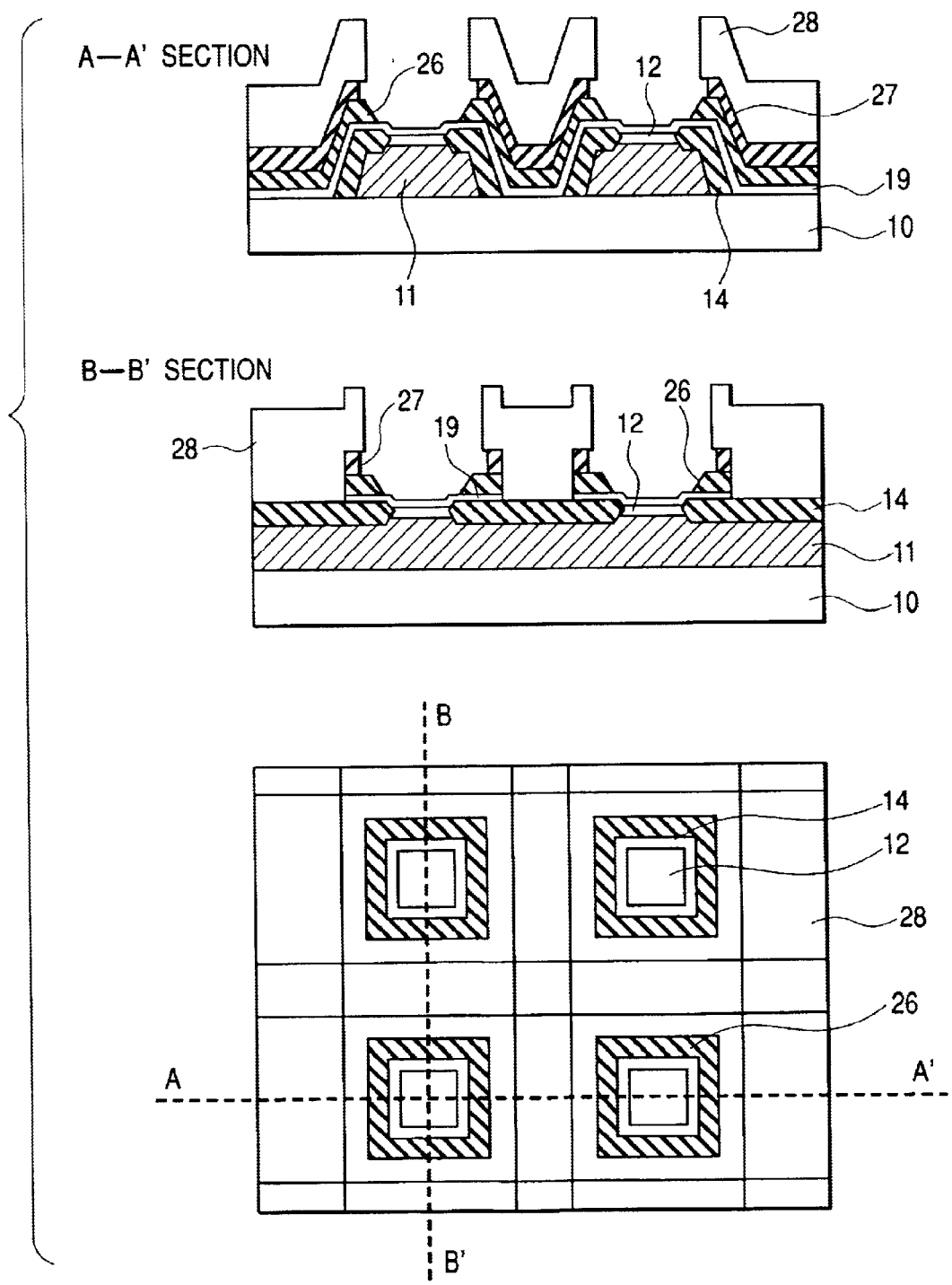
FIG. 12 is a diagram showing the manufacturing process of the thin film cathode of the present invention.

Next, the Al—Nd alloy first metal layer (top bus electrode) 26 is tapered through photo process and wet etching process so that the film thickness decreases toward the electron emission portion side. The taper can be realized by means of a process in which prebaking temperature after coating of resist and postbaking temperature after development are lowered in comparison with the temperature that is applied usually, adhesion of the resist is made poor, and the resist is recessed during wet etching process (FIG. 12).

Figure 13:
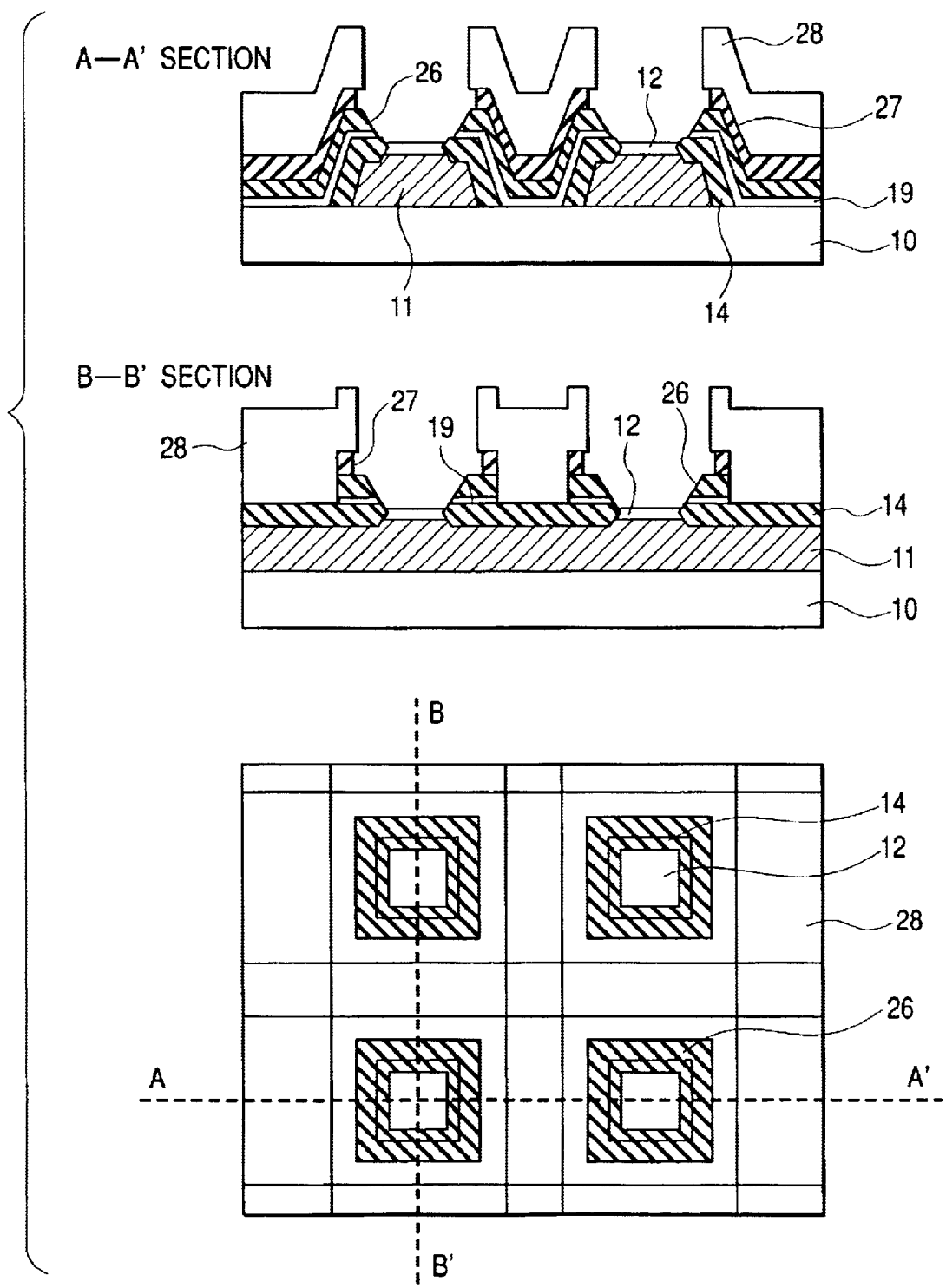
FIG. 13 is a diagram showing the manufacturing process of the thin film cathode of the present invention.

Next, the second protective insulator 19 consisting of $SiO_2$ is subjected to dry etching to form an aperture of the electron emission portion. Because the second protective insulator 19 consisting of $SiO_2$ is etched faster than the electron acceleration layer 12 comprising the anodized film consisting of Al alloy and the protective insulator 14 at high selection ratio by means of dry etching technique by use of fluoride-base etching gas such as $CF_4$ or $SF_6$, damage of the electron acceleration layer 12 is reduced (FIG. 13).

Figure 14:
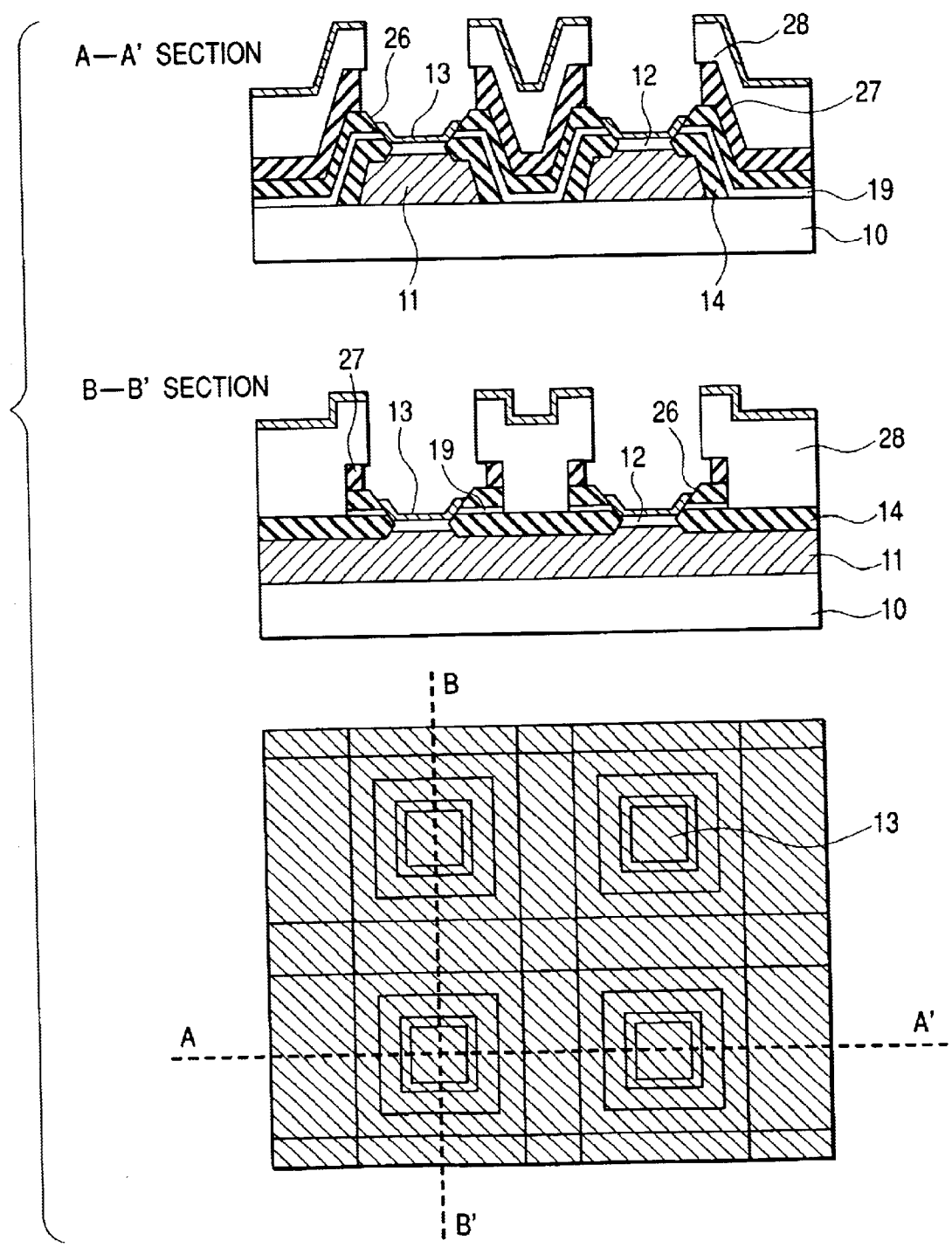
FIG. 14 is a diagram showing the manufacturing process of the thin film cathode of the present invention.
Figure 15:
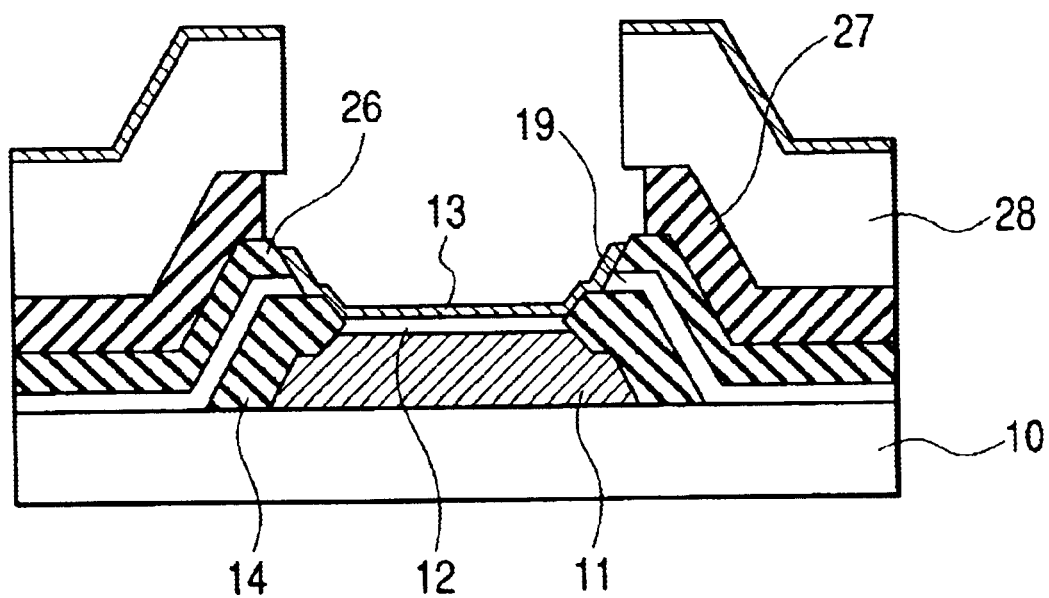
FIG. 15 is a diagram showing the manufacturing process of the thin film cathode of the present invention.

Next, the electron acceleration layer 12 is subjected to re-anodizing to restore the damage. After restoration of the electron acceleration layer 12, finally the top electrode 13 film is formed. For example, sputtering film forming technique is employed for forming the top electrode 13 film. For example, a laminate film comprising an Ir film, Pt film, and Au film having a thickness of several nm is used as the top electrode 13. Herein, the film having a thickness of 5 nm is used. The formed thin top electrode 13 is cut with the overhang of the aperture of the insulator 28 and separated into individual cathodes, and is in contact with the second metal layer 27 and the first metal layer (top bus electrode) 26 comprising the Al—Nd film that is tapered from the second metal layer 27 and the insulator 28 toward the electron emission portion side for receiving current supply (FIG. 14). A cross sectional structure of one element of the thin film cathode of the present invention that has been fabricated in this embodiment as described hereinabove is shown in FIG. 15.

As described hereinabove, the laminate film that is formed of the top bus electrode and the overhang structure has the laminate structure comprising the first metal layer (top bus electrode) 26, the second metal layer 27, and the insulator 28 in the order from the top bus electrode side. Materials that can be etched selectively are combined, or material for forming the first metal layer (top bus electrode) 26 that is etched slowest and material for forming the top bus electrode side film of the laminate film on the first metal layer 26 that is etched fastest in the same etchant are combined to form the overhang structure. The top electrode can be separated into individual cathodes by use of the overhang structure having the projected insulator 28 on the second metal layer 27 that has been formed as described hereinabove. Furthermore, the first metal layer (top bus electrode) 26 is tapered so that the film thickness decreases toward the electron emission portion side to thereby realize a thin film cathode with high reliability in electric connection to the top electrode 13.

(Second Embodiment)

One embodiment of a MIM type thin film cathode having a laminate film that is formed of a top bus electrode and overhang structure comprising a first metal layer (top bus electrode), an insulator, and a second metal layer in the order from the top bus electrode side will be described as the second embodiment of the present invention that realizes the objects.

Figure 16:
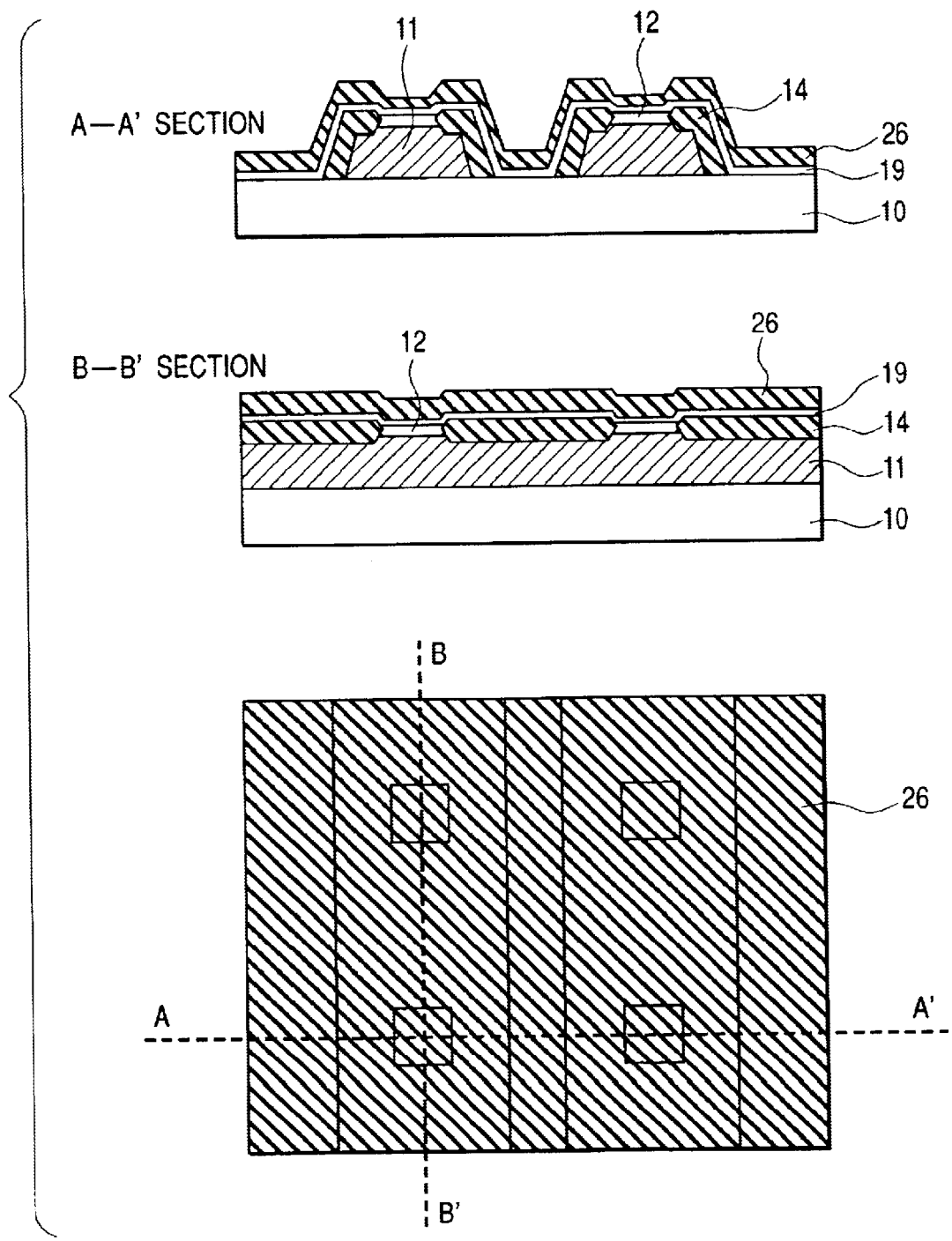
FIG. 16 is a diagram showing the manufacturing process of the thin film cathode of the present invention.

At first, components including up to the electron acceleration layer 12 are formed in the same manner as applied in the embodiment 1. Subsequently, a second protective insulator 19 and a first metal layer 26 are formed. For example, Si oxide film having a thickness of 40 nm is used as the second protective insulator 19. Furthermore, Al—Nd alloy is used as the material of the first metal layer 26. Otherwise, Cr or Cr alloy may be used for the first metal layer 26. The thickness of the first metal layer 26 is 300 nm (FIG. 16).

Figure 17:
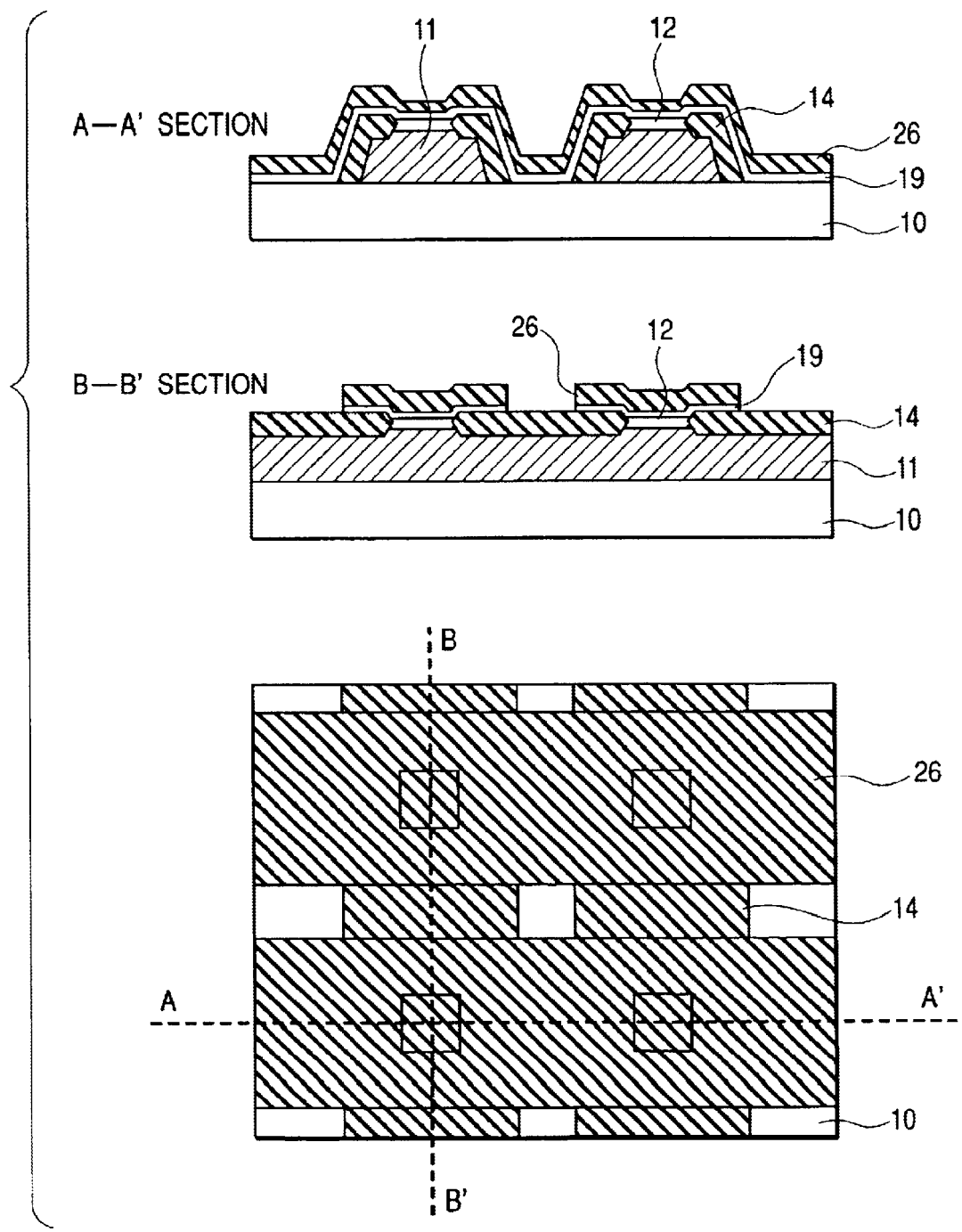
FIG. 17 is a diagram showing the manufacturing process of the thin film cathode of the present invention.

Subsequently, the first metal layer (top bus electrode) 26 is subjected to photoetching process so as to be orthogonal to the base electrode 11. An aqueous mixed solution of phosphoric acid, acetic acid, and nitric acid is used as the etchant (FIG. 17).

Figure 18:
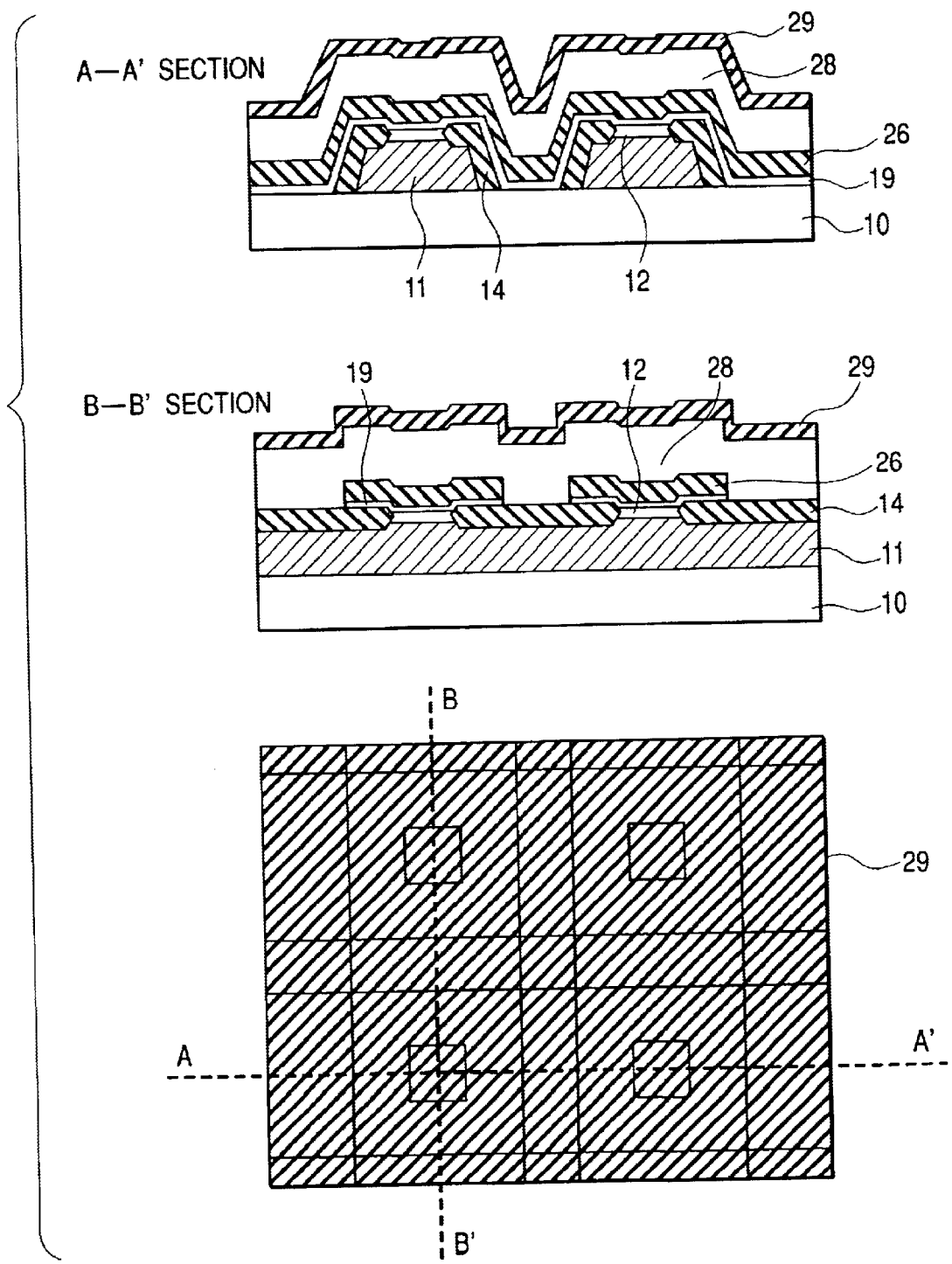
FIG. 18 is a diagram showing the manufacturing process of the thin film cathode of the present invention.

Next, a laminate film comprising an insulator 28 and a second metal layer (surface electrode) 29, which will be formed into the overhang structure, is formed. The insulator 28 may consists of, for example, $SiO_2$ or $Si_3O_4$. In this embodiment, $SiO_2$ is used and the film thickness is 300 nm. The second metal layer 27 may consist of Al, Al alloy, Cr, Cr alloy, or W. In this embodiment, Al—Nd alloy is used, and the film thickness is 200 nm (FIG. 18).

Figure 19:
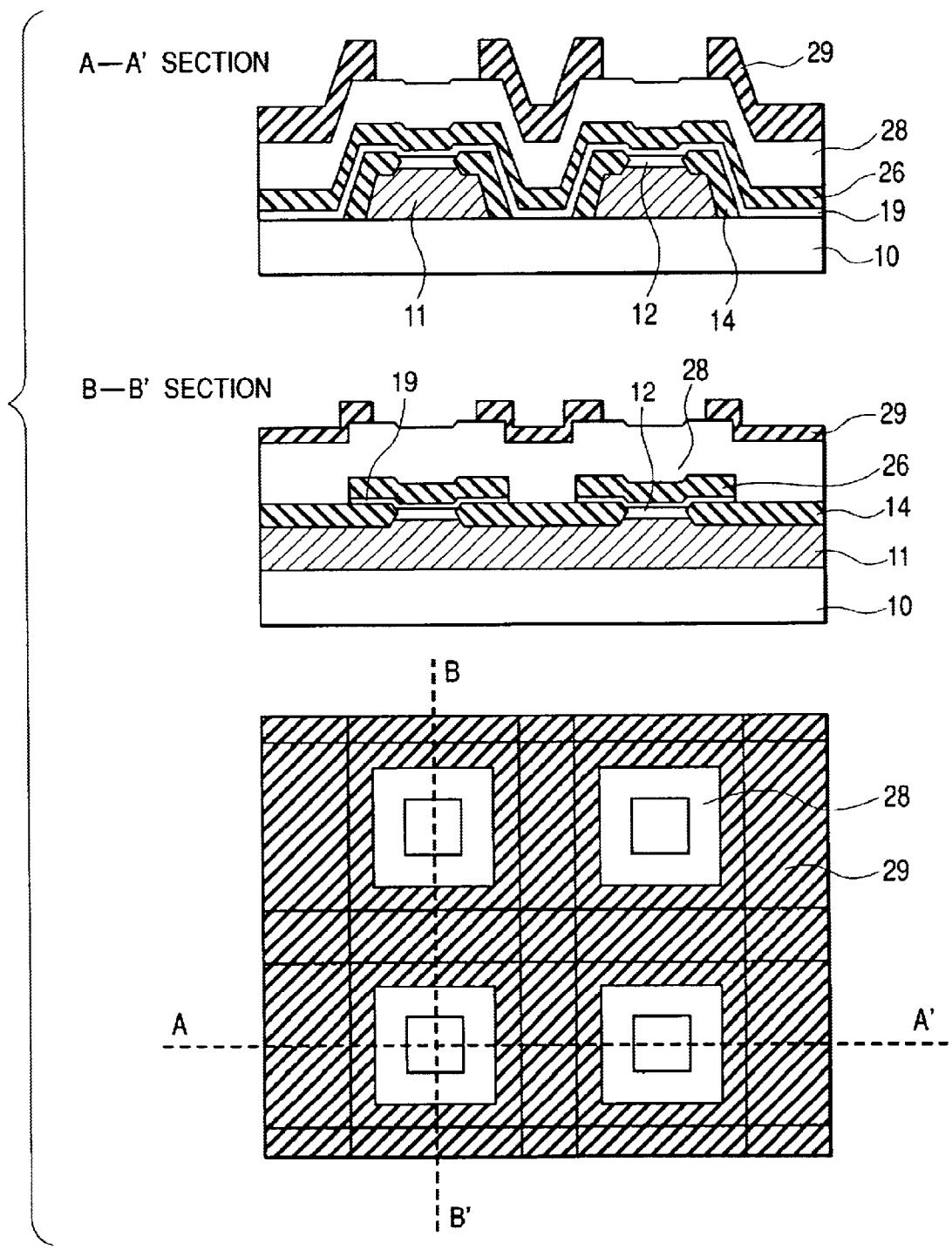
FIG. 19 is a diagram showing the manufacturing process of the thin film cathode of the present invention.
Figure 20:
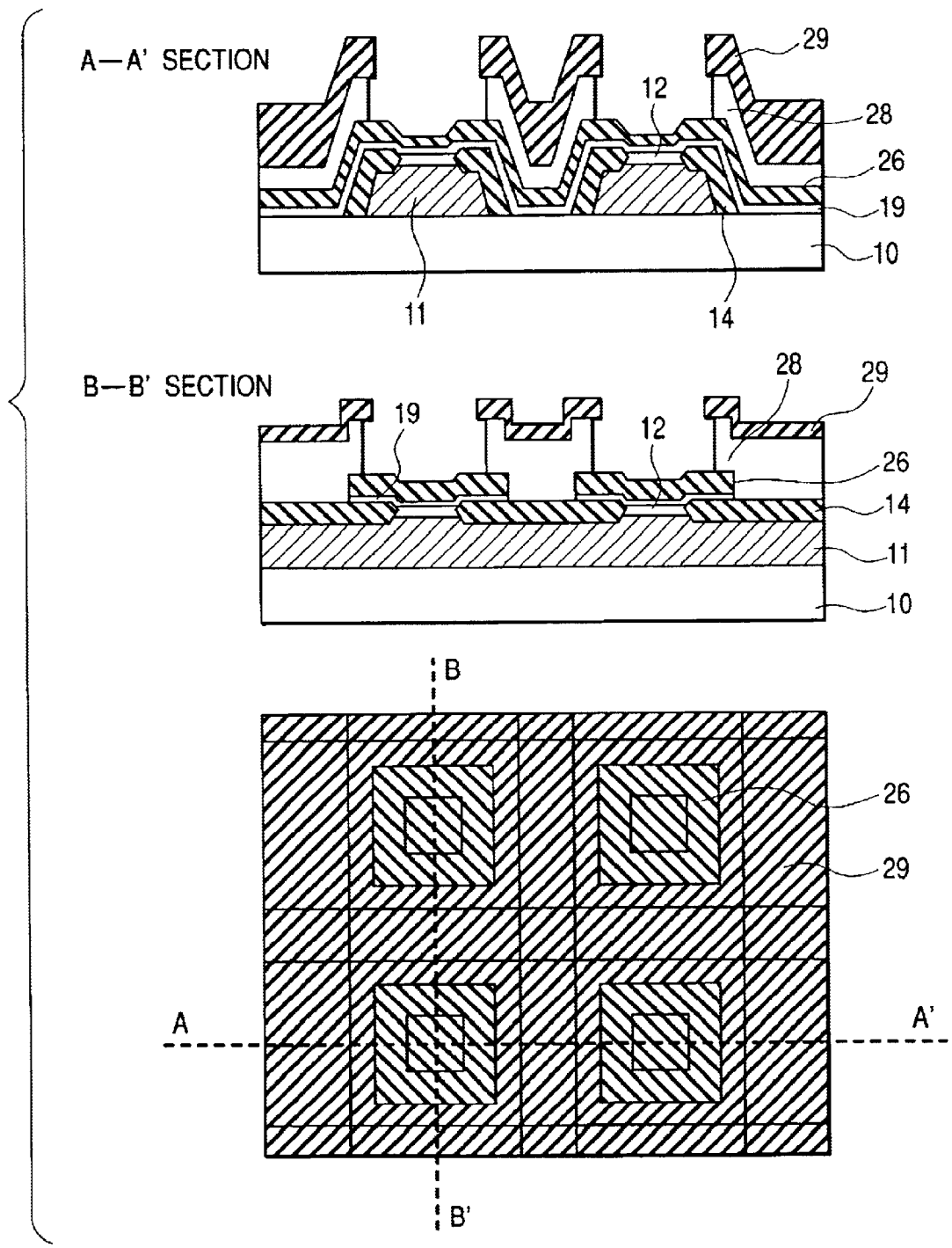
FIG. 20 is a diagram showing the manufacturing process of the thin film cathode of the present invention.

Subsequently, an aperture is formed on the region of the second metal layer (surface electrode) 29 including an electron emission portion by means of photoetching technique. An aqueous mixed solution of phosphoric acid, acetic acid, and nitric acid is used as the etchant (FIG. 19). Subsequently, the insulator 28 is subjected to dry etching with $CF_4$ or $SF_6$ by utilizing the second metal layer (surface electrode) 29 as the mask. Because the insulator 28 consisting of $SiO_2$ is etched faster than the first metal layer 26 and the second metal layer (surface electrode) 29 consisting of Al—Nd alloy at high selection ratio by means of dry etching technique by use of fluoride-base etching gas such as $CF_4$ or $SF_6$, it is possible to etch only the insulator 28. Therefore, the insulator 28 is recessed inward with respect to the second metal layer (surface electrode) 29, and the overhang structure is formed thereby (FIG. 20). At that time, the first metal layer (top bus electrode 26) consisting of Al—Nb alloy is served as the stopper film. In the case that W is used for the second metal layer (surface electrode) 29, by applying dry etching technique by use of fluoride-base etching gas such as $CF_4$ or $SF_6$, the insulator 28 is etched faster than the second metal layer (surface electrode) 29 consisting of W. Therefore, the sufficient over-etching causes recession of the insulator 28 inward with respect to the second metal layer (surface electrode) 29, and as the result the overhang structure is formed. At that time, the first metal layer (top bus electrode) 26 consisting of Al—Nb alloy is served as the stopper film.

Figure 21:
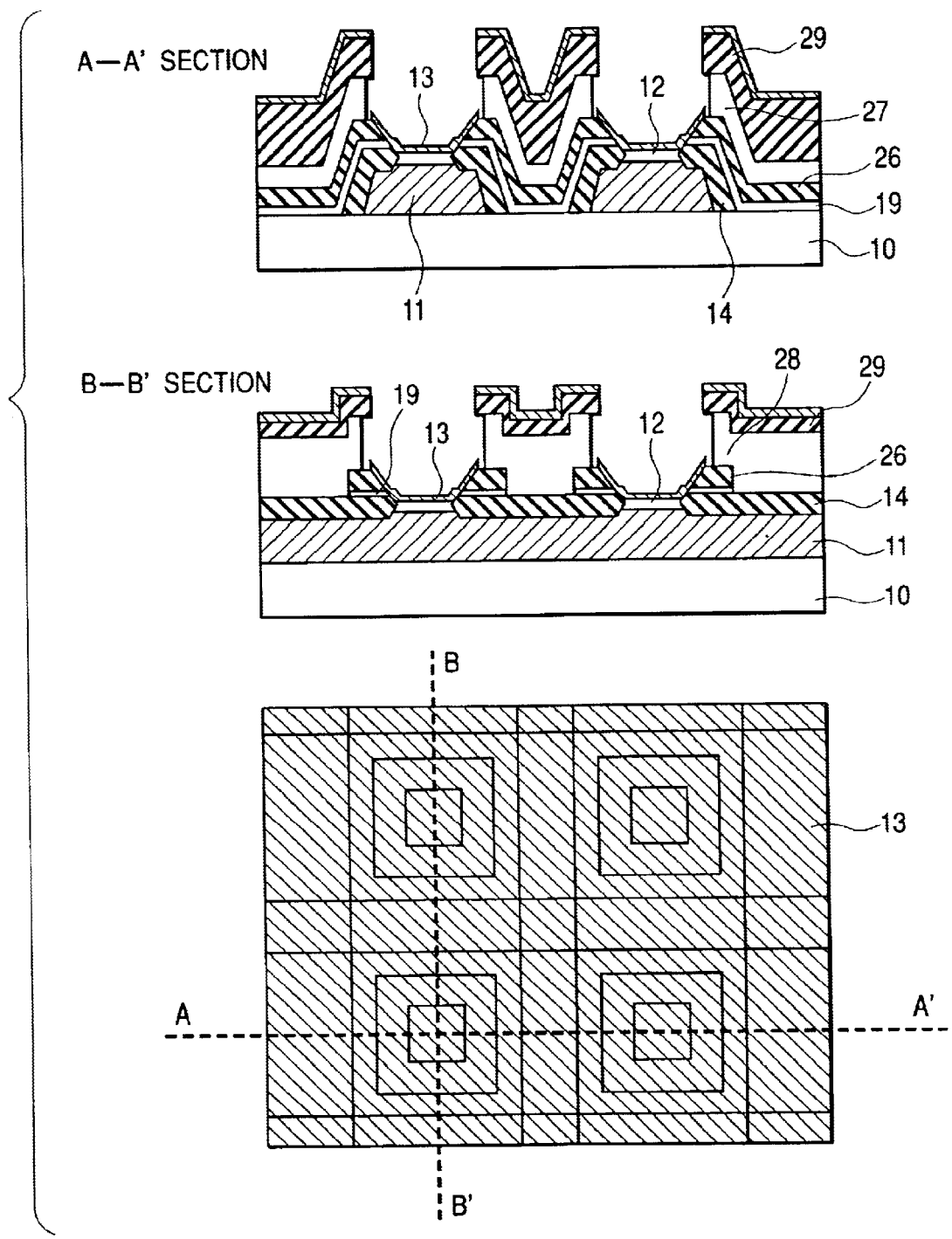
FIG. 21 is a diagram showing the manufacturing process of the thin film cathode of the present invention.
Figure 22:
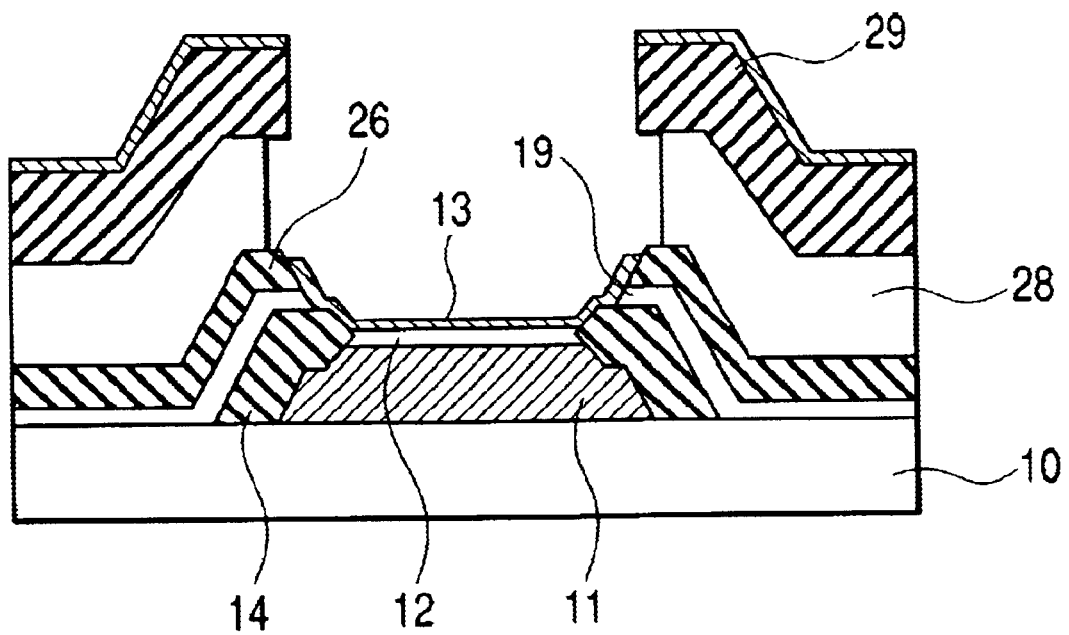
FIG. 22 is a diagram showing the manufacturing process of the thin film cathode of the present invention.

Following to the process, the first metal layer (top bus electrode) 26 consisting of Al—Nd alloy is tapered so that the film thickness decreases toward the electron emission portion side in the same manner as applied in the first embodiment. Subsequently, the second protective insulator 19 consisting of $SiO_2$ is subjected to dry etching to thereby form an electron emission portion aperture, and the electron acceleration layer 12 is re-anodized to restore the damage. Finally, a top electrode 13 film is formed to complete a thin film cathode array (FIG. 21). The cross sectional structure of one element of the thin film cathode array of the present invention fabricated in the embodiment is shown in FIG. 22.

As described hereinabove, the laminate film that is formed of the top bus electrode and the overhang structure has the laminate structure comprising the first metal layer (top bus electrode) 26, the insulator 28, and second metal layer (surface electrode) 29 in the order from the top bus electrode side. Materials that can be etched selectively are combined, or material for forming the first metal layer (top bus electrode) 26 that is etched slowest and material for forming the top bus electrode side film of the laminate film on the first metal layer 26 that is etched fastest in the same etchant are combined to form the overhang structure. The top electrode 13 can be separated into individual cathodes by use of the overhang structure having the projected second metal layer (surface electrode) 29 on the insulator 28 that has been formed as described hereinabove. Furthermore, the first metal layer (top bus electrode) 26 is tapered so that the film thickness decreases toward the electron emission portion side to thereby realize a thin film cathode with high reliability in electric connection to the top electrode 13.

(Third Embodiment)

One embodiment of a MIM type thin film cathode having a laminate film that is formed of a top bus electrode and overhang structure comprising a first metal layer (top bus electrode), a first insulator, and a second insulator in the order from the top bus electrode side will be described as the third embodiment of the present invention that realizes the objects.

At first, the first metal layer (top bus electrode) 26 is formed in the same manner as applied in the second embodiment so as to be orthogonal to the base electrode 11. In this embodiment, Al—Nd alloy is used as the material for forming the first metal layer 26. Otherwise, Cr or Cr alloy may be used as the material for forming the first metal layer 26. The film thickness is 300 nm (FIG. 17)

Figure 23:
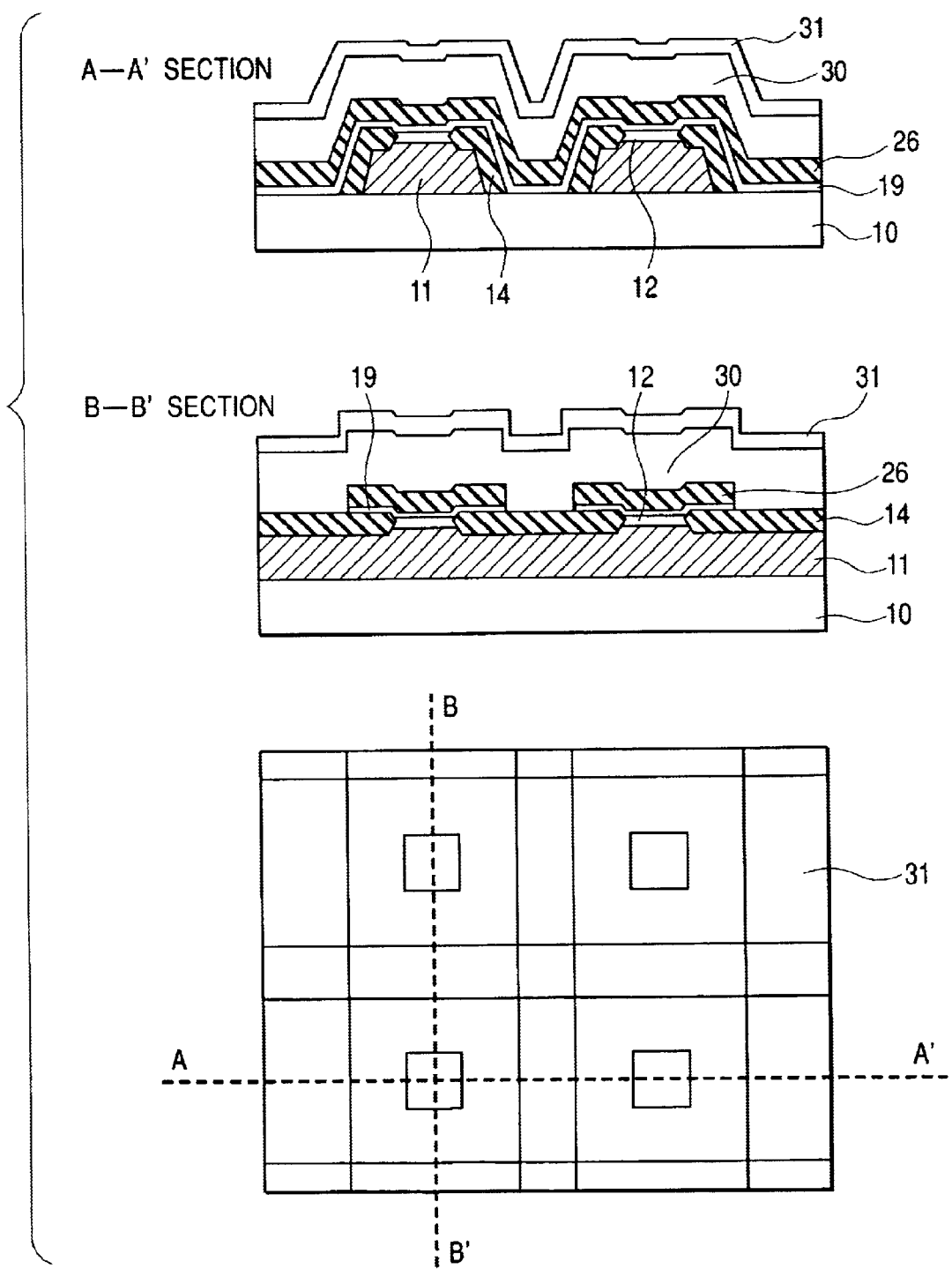
FIG. 23 is a diagram showing the manufacturing process of the thin film cathode of the present invention.

Next, a laminate film comprising a first insulator 30 and a second insulator 31, which will be formed into the overhang structure, is formed (FIG. 23). In this embodiment, $Si_3N_4$ is used as the material for forming the first insulator 30, and $SiO_2$ is used as the material for forming the second insulator 31. The film thicknesses are 300 nm and 150 nm respectively.

Figure 24:
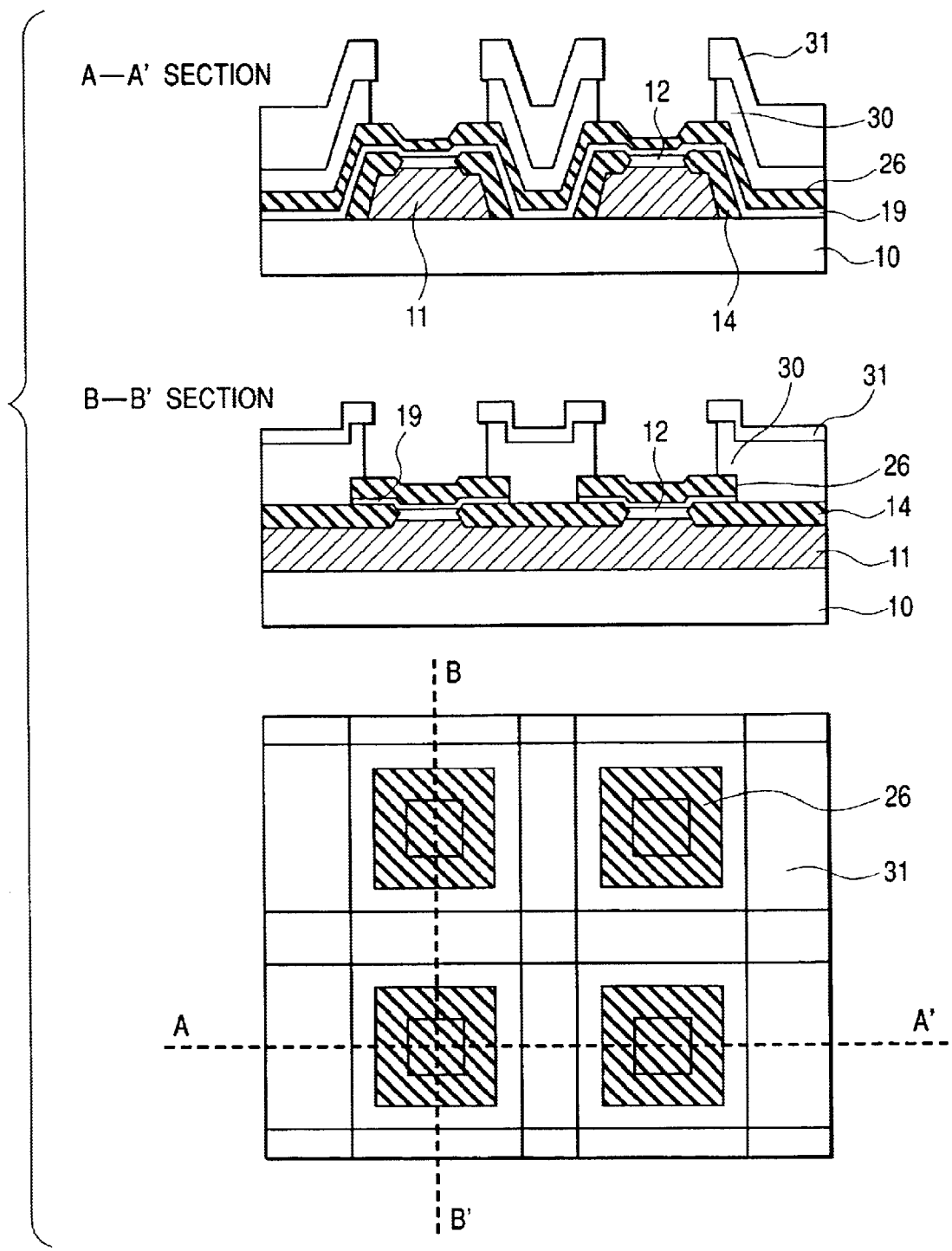
FIG. 24 is a diagram showing the manufacturing process of the thin film cathode of the present invention.

Subsequently, an aperture is formed on the region of the second insulator 31 and the first insulation layer 30 including the electron emission portion. In this embodiment, dry etching technique is applied by use of $CF_4$ or $SF_6$. Because the first insulator 30 consisting of $Si_3N_4$ is etched faster than the second insulator 31 consisting of $SiO_2$ by applying dry etching by use of fluoride etching gas such as $CF_4$ or $SF_6$, the sufficient over-etching causes recession of the first insulator 30 inward with respect to the second insulator 31, and as the result the overhang structure is formed (FIG. 24). At that time, the first metal layer (top bus electrode) 26 consisting of Al—Nd alloy is served as the stopper film.

A Spin-On-Glass film and a coating type insulator such as polysilazane that are different in etching speed each other may be used as the first insulator 30 and the second insulator 31 respectively in the form of the laminate film, or otherwise a coating type insulator and a film consisting of $SiO_2$ or $Si_3N_4$ deposited by sputtering or CVD may be used as the first insulator 30 and the second insulator 31 respectively in the form of the laminate film. Generally, because dry etching speed of an insulator depends on the density, combination of the first insulator 30 consisting of a material that is etched fast and the second insulator 31 consisting of a material that is etched slow is employed to form the overhang structure.

Figure 25:
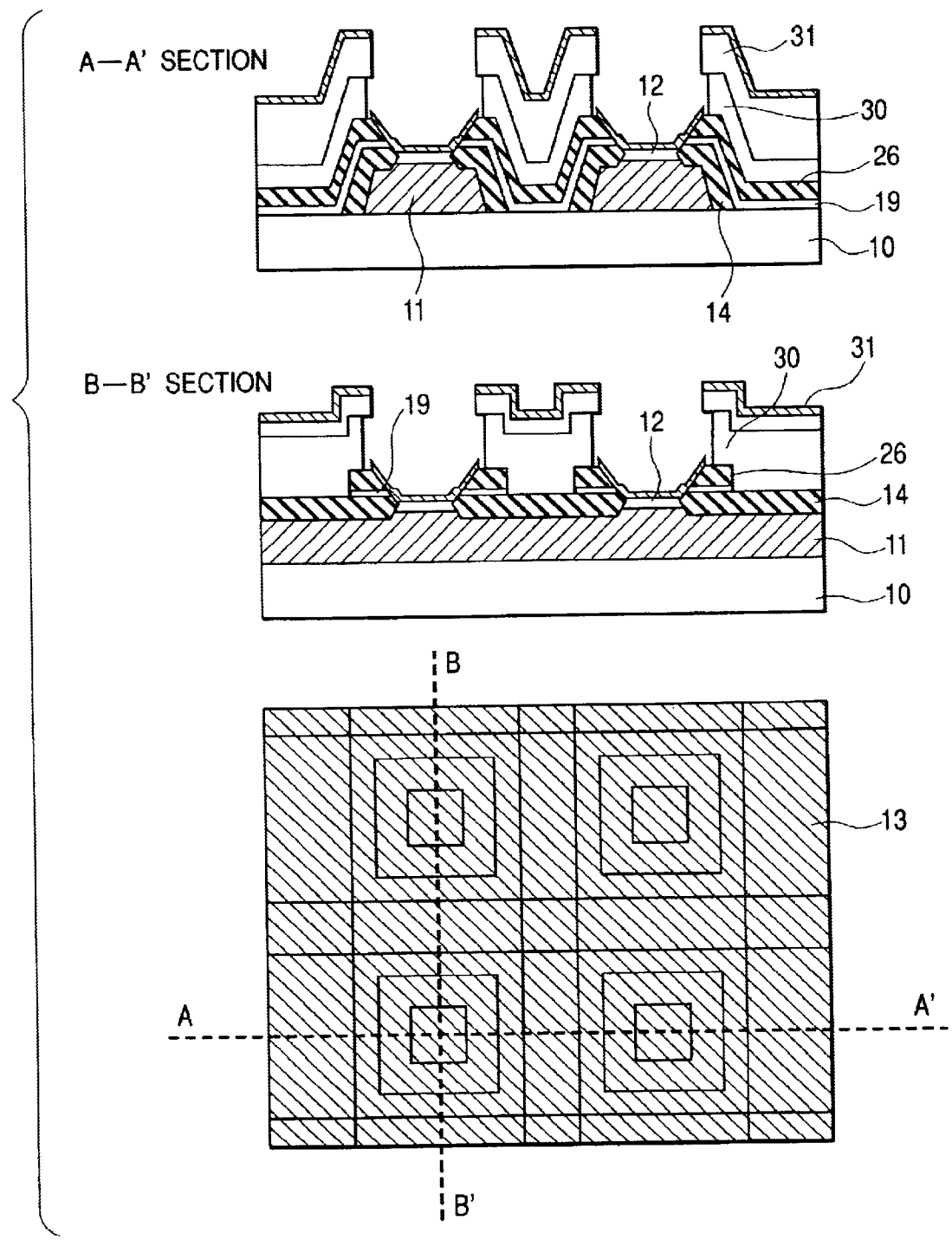
FIG. 25 is a diagram showing the manufacturing process of the thin film cathode of the present invention.

Following the process, the first metal layer (top bus electrode) 26 consisting of Al—Nd alloy is tapered so that the film thickness decreases toward the electron emission portion side in the same manner as applied in the first embodiment. Subsequently, the second protective insulator 19 consisting of $SiO_2$ is subjected to dry etching to thereby form an electron emission portion aperture, and the electron acceleration layer 12 is re-anodized to restore the damage. Finally, a top electrode 13 film is formed to complete a thin film cathode array (FIG. 25).

Figure 1:
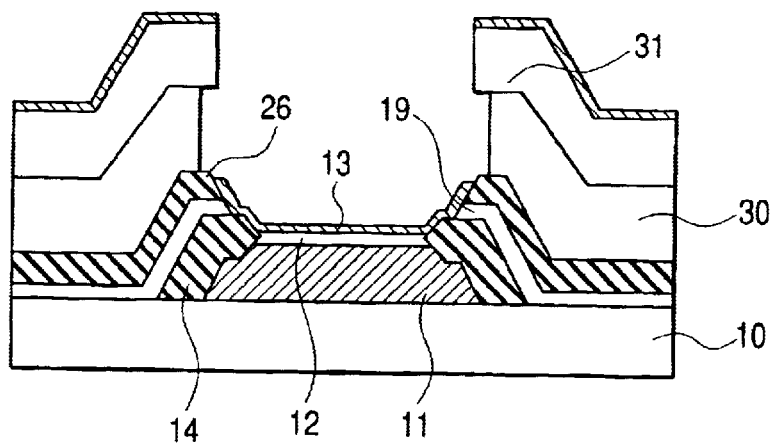
FIG. 1 is a diagram showing the structure of a thin film cathode of the present invention.
Figure 2:
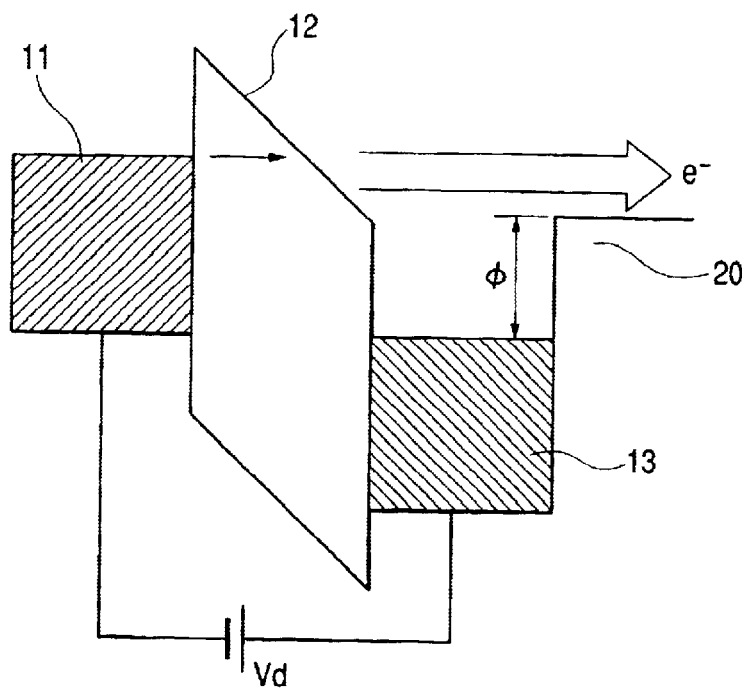
FIG. 2 is a diagram showing the operation principle of the thin film cathode.
Figure 3:
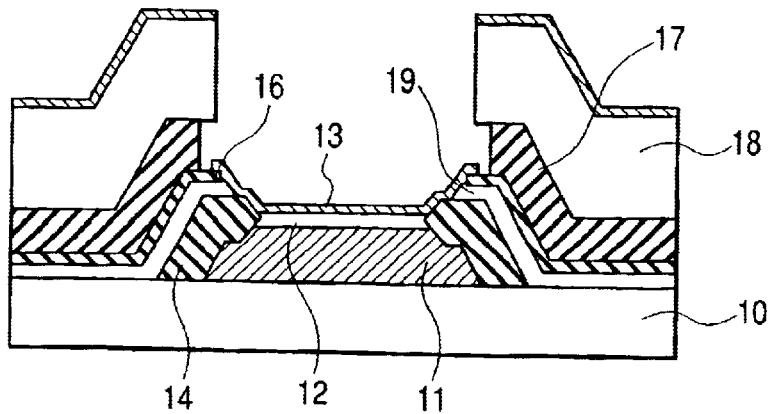
FIG. 3 is a diagram showing the conventional structure of a thin film cathode.

The cross sectional structure of one element in the thin film cathode array of the present invention fabricated in the embodiment is shown in FIG. 1.

As described hereinabove, the laminate film that if formed of the top bus electrode and the overhang structure has the laminate structure comprising the first metal layer (top bus electrode) 26, the first insulator 30, and the second insulator 31 in the order from the top bus electrode side. Materials that can be etched selectively are combined, or material for forming the first metal layer (top bus electrode) 26 that is etched slowest and material for forming the top bus electrode side film of the laminate film on the first metal layer 26 that is etched fastest in the same etchant are combined to form the overhang structure. The top electrode 13 can be separated into individual cathodes by use of the overhang structure having the projected second insulator 31 on the first insulator 30 that has been formed as described hereinabove. Furthermore, the first metal layer (top bus electrode) 26 is tapered so that the film thickness decreases toward the electron emission portion side to thereby realize a thin film cathode with high reliability in electric connection to the top electrode 13.

(Forth Embodiment)

Figure 26:
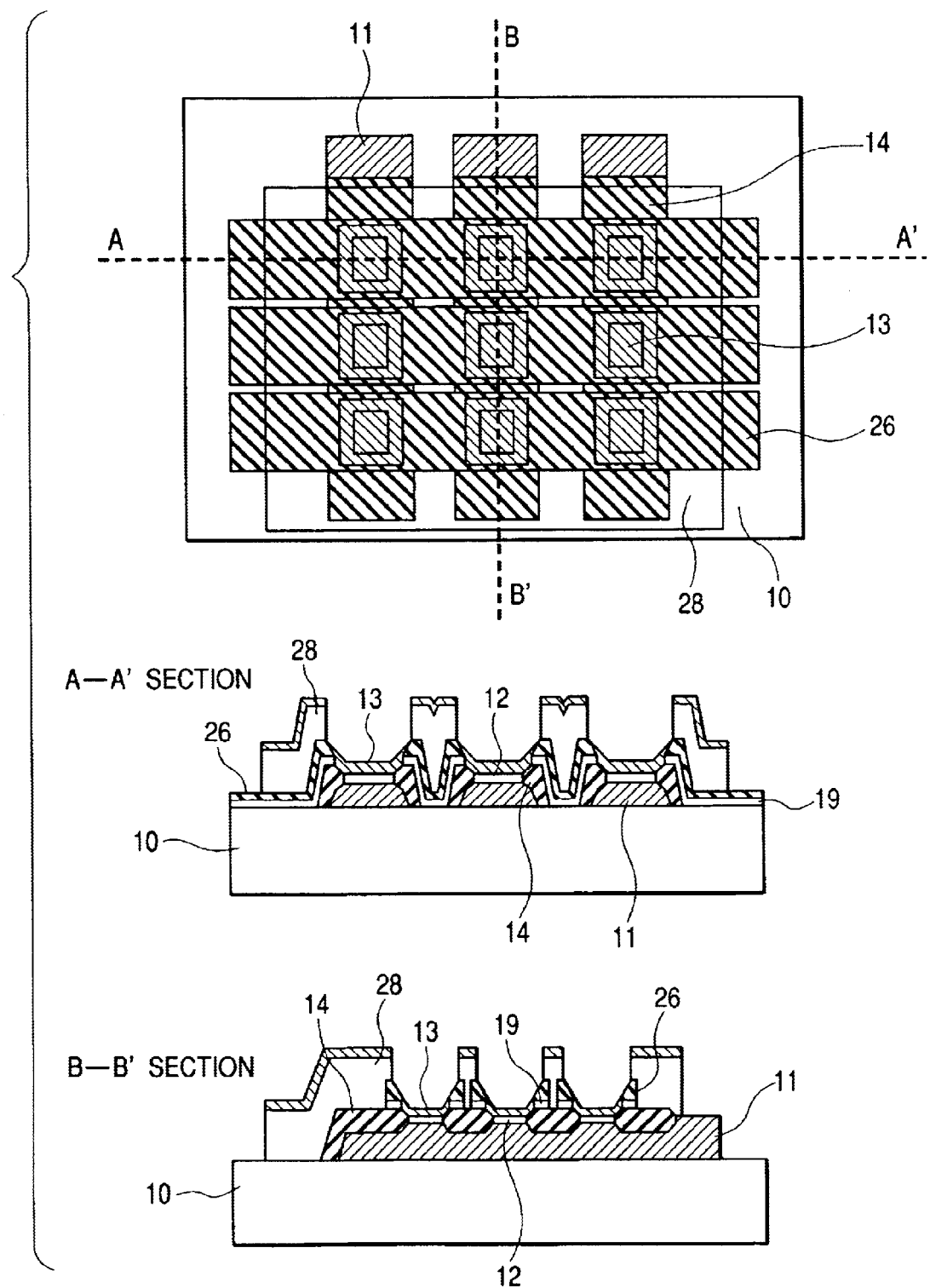
FIG. 26 is a diagram showing a cathode substrate of a display device that uses a thin film cathode of the present invention.
Figure 28:
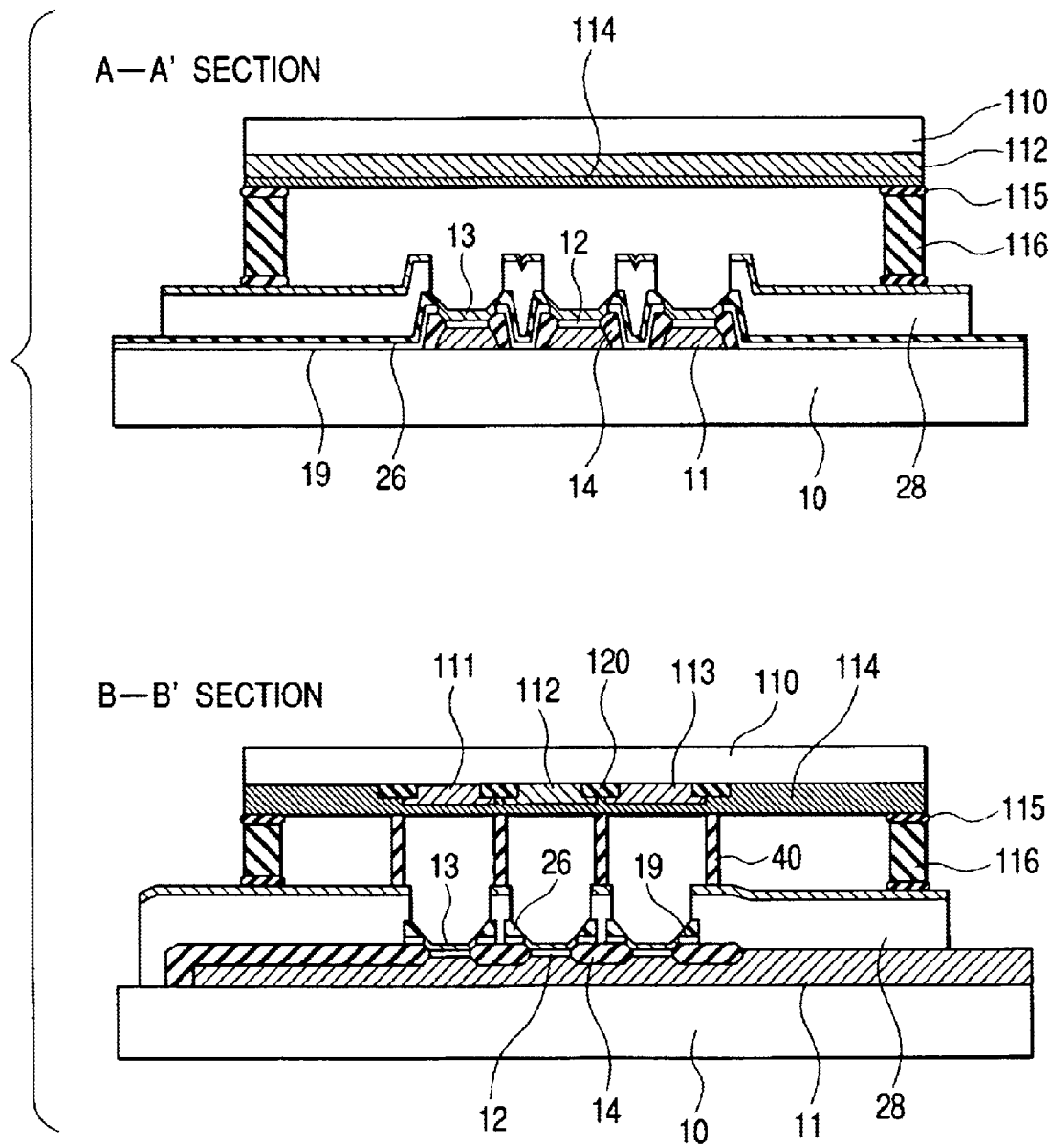
FIG. 28 is a diagram showing a cross section of a display device that uses a thin film cathode of the present invention.
Figure 29:
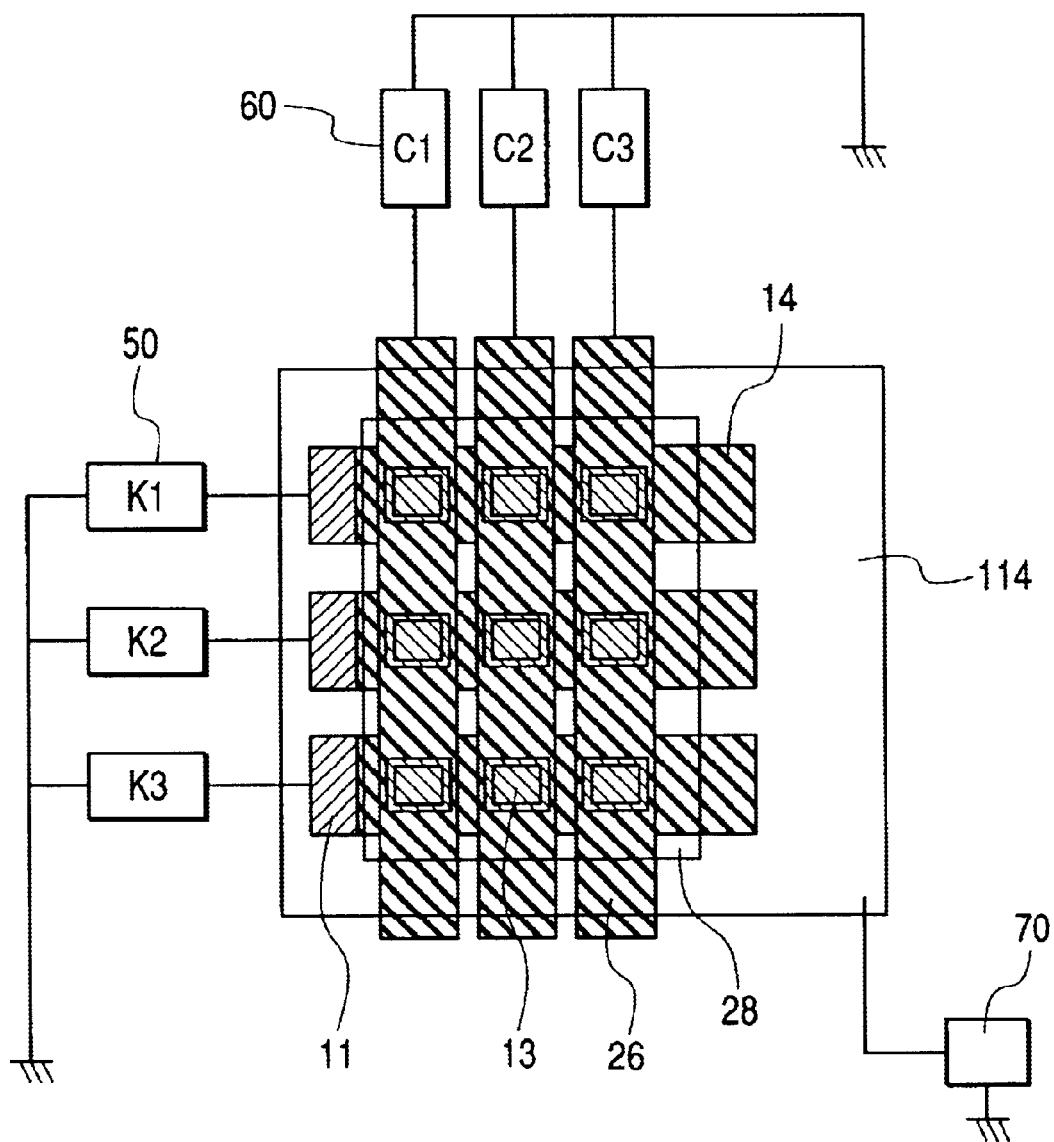
FIG. 29 is a diagram showing a connection to a driving circuit of a display device to which the present invention is applied.

Next, an exemplary display device of the present invention fabricated by means of a process in which the thin film cathode array substrate (FIG. 26) fabricated in the first embodiment and a phosphor screen are adhered with interposition of a spacer will be described herein under. In FIG. 26, FIG. 28, and FIG. 29, the top bus electrode 26 is shown as the one piece component though it comprises the first metal layer (top bus electrode) 26 and the second metal layer 27 for the purpose of simple description of the drawings. In the following description, in the cases of the display devices that use cathodes fabricated according to the second embodiment and third embodiment, the top bus electrode is shown in the same manner as described hereinabove.

A display side substrate is fabricated as described herein under (FIG. 25). A transparent glass is used as the face plate 110.

At first, a black matrix 120 is formed to enhance the contrast of the display device. The black matrix 120 is formed by means of a process in which a mixed solution containing PVA (polyvinylalcohol) and sodium bichromate is coated on the face plate 110, an ultra-violet ray is irradiated on the region where the black matrix is not to be formed so as to be exposed to the ultra-violet ray, un-exposed region is removed, a solution containing black lead powder is coated on the un-exposed region, and PVA is lifted off.

Next, a red phosphor 111 is formed. A mixed solution containing phosphor particles, PVA (polyvinylalcohol), and sodium bichromate is coated on the face plate 110, an ultra-violet ray is irradiated on the region where phosphor is to be formed so as to be exposed to the ultra-violet ray, and un-exposed region is removed with flowing water. The red phosphor 111 is patterned in stripes as described hereinabove as shown in FIG. 27. Green phosphor 112 and blue phosphor 113 are formed in the same manner as used for forming the red phosphor 111. For example, $Y_2O_2S$:Eu (P22-R) may be used as the red phosphor, ZnS:Cu, Al (P22-G) may be used as the green phosphor, and ZnS:Ag, Cl (P22-B) may be used as the blue phosphor.

Next, the face plate 110 is subjected to filming by use of a nitrocellulose film, and Al having a thickness of approximately 75 nm is deposited on the entire surface of the face plate 110 by means of vacuum evaporation technique to form a metal back 114. The metal back 114 functions as an acceleration electrode. Thereafter, the face plate 110 is heated to a temperature of approximately 400° C. in an atmospheric environment for thermal decomposition of organic substances such as the filming film and PVA. A display side substrate is completed as described hereinabove.

The peripheral frame 116 of the display side substrate fabricated as described hereinabove is sealed to the substrate 10 with interposition of a spacer 40 by use of frit glass 115. The sealing is carried out in an atmospheric environment to remove organic compounds contained in the frit glass paste. Equipment and work for gas replacing can be omitted by employing the sealing in the atmospheric environment, and the low cost manufacturing is brought about. Though the sealing in the atmospheric environment is employed, only the surface of the first metal layer (top bus electrode) 26 consisting of Al—Nd is oxidized, and on the other hand the first metal layer (top bus electrode) 26 is alloyed with the top electrode material by heating to bring about the stable electric connection.

FIG. 28 shows portions that are equivalent to A–A' cross section and B–B' cross section of the laminated display panel. The height of the spacer 40 is adjusted so that the distance between the face plate 110 and the substrate 10 is 1 to 3 mm. The spacer 40 is held vertically on the insulator 28 that is covered with the top electrode 13 film. In this embodiment, a spacer 40 is provided on every dot that emits red, green, and blue for the purpose of description, however, the number of spacers 40 (density) may be reduced within some range so as to withstand the mechanical load. Usually, the spacer 40 is provided at intervals of 1 cm.

The sealed panel is evacuated to a vacuum of $10^{-7}$ Torr and sealed. After sealing, the getter is activated to maintain the inside of the panel in vacuum. For example, in the case of a getter material mainly containing Ba, a getter film is formed by means of high frequency induction heating technique. Otherwise, a non-volatile type getter mainly containing Zr may be used.

As described hereinabove, because the distance between the face plate 110 and the substrate 10 is as long as 1 to 3 mm in this embodiment, a high acceleration voltage as high as 3 to 6 KV can be applied on the metal back 114. Therefore, as described hereinabove, phosphor used for a cathode ray tube (CRT) can be used as the phosphor.

FIG. 29 is a connection diagram showing the connection of the display device panel fabricated as described hereinabove to a driving circuit. A base electrode 11 is connected to a base electrode driving circuit 50, and a top bus electrode 26 is connected to a top electrode driving circuit 60. The intersection of m-th base electrode 11 Km and n-th top bus electrode 26 Cn is represented by (m, n). An acceleration voltage 70 of approximately 3 to 6 KV is applied on the metal back 114 continuously.

Figure 30:
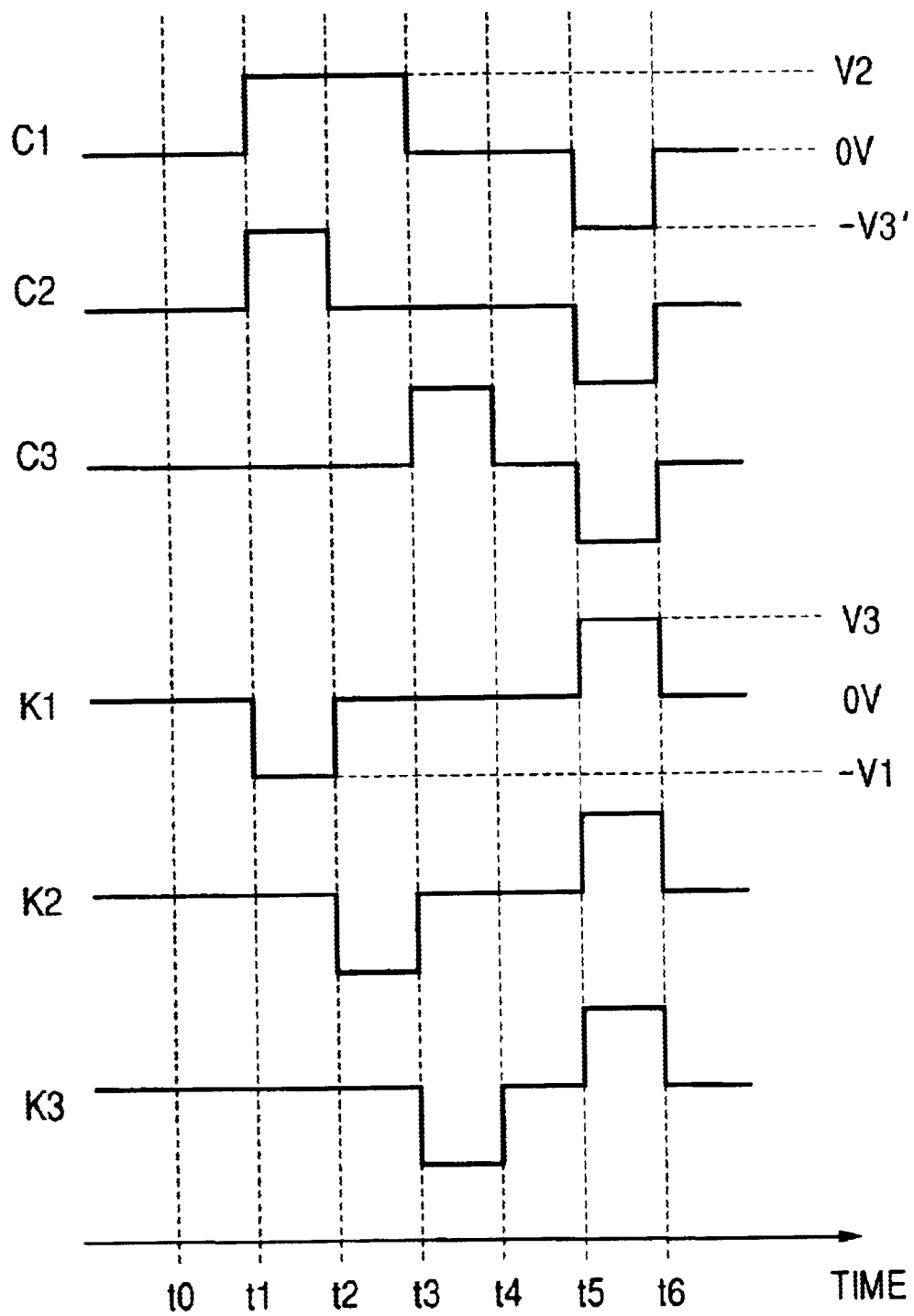
FIG. 30 is a diagram showing a driving voltage waveform used in a display device of the present invention.

FIG. 30 shows exemplary voltage waveforms generated from respective driving circuits. Because the voltage of all the electrodes is zero at the time t0, no electron is emitted, and the phosphor is not luminous. At the time t1, a voltage of −V1 is applied on the base electrode 11 K1, and a voltage of +V2 is applied on the top bus electrode 26 C1, C2. A voltage of (V1+V2) is applied between the base electrode 11 and the top electrode 13 at the intersections (1, 1) and (1, 2). If (V1+V2) is set at the level higher than the electron emission starting voltage, electrons are emitted from the thin film cathodes located at the two intersections into the vacuum. The acceleration voltage 70 applied on the metal back 114 accelerates the emitted electrons, the accelerated electrons impinge against the phosphor, and the phosphor is luminous. At the time t2, a voltage −V1 is applied on the base electrode 11 K2 and a voltage of V2 is applied on the top bus electrode 26 C1, the intersection (2, 1) is luminous similarly. As described hereinabove, by changing the signal supplied to the top bus electrode 26, a desired image or information can be displayed. Furthermore, by changing the magnitude of the voltage V1 applied on the top bus electrode 26 preferably, a gradational image can be displayed. The reverse voltage is applied to release charges accumulated in the electron acceleration layer 12 by applying −V1 on all the base electrodes 11 and then by applying V3 on all the base electrodes 11 and −V3' on all the top bus electrodes 26.

By applying the technique, a thin film cathode having no defect can be fabricated, and the manufacturing yield of the display device can be improved.

What is claimed is:

1. A display device comprising:
    a substrate having a base electrode, a top electrode, and an electron acceleration layer disposed between the base electrode and the top electrode, which substrate is formed of arrayed thin film cathodes that emit electrons from the top electrode side by applying a voltage between the base electrode and the top electrode; and
    a phosphor screen,
    wherein the arrayed thin film cathodes have a top bus electrode served as a current feed line to the top electrode, which top bus electrode is tapered so that the film thickness decreases toward an electron emission portion side, and have an overhang structure that separates the top electrode into individual cathodes.

2. The display device according to claim 1, wherein the top bus electrode and the overhang structure form a laminate constituted of a first metal layer (top bus electrode), second metal layer, and insulator in the order from the top bus electrode side.

3. The display device according to claim 1, wherein the top bus electrode and the overhang structure form a laminate constituted of a first metal layer (top bus electrode), an insulator, and a second metal layer in the order from the top bus electrode side.

4. The display device according to claim 1, wherein the top bus electrode and the overhang structure form a laminate constituted of a first metal layer (top bus electrode), a first insulator, and a second insulator in the order from the top bus electrode side.

5. The display device according to claim 1, wherein combination of a material used for the top bus electrode that is etched slowest and a material used for the film of the overhang laminate film disposed on the side of the top bus electrode that is etched fastest with the same etchant is employed for the top bus electrode and the overhang structure.

6. The display device according to claim 1, wherein the top bus electrode and the overhang structure are formed of combination of materials that are etched selectively.

7. A display device comprising:
    a substrate having a base electrode, a top electrode, and an electron acceleration layer disposed between the base electrode and the top electrode, which substrate is formed of arrayed thin film cathodes that emit electrons from the top electrode side by applying a voltage between the base electrode and the top electrode; and
    a phosphor screen,
    wherein the arrayed thin film cathodes have a top bus electrode served as a current feed line to the top electrode, which top bus electrode is tapered so that the film thickness decreases toward an electron emission portion side, and have an overhang structure that separates the top electrode into individual cathodes, and the overhang structure is constitute of a laminate of films consisting of two or more different materials respectively.

8. The display device according to claim 7, wherein the top bus electrode and the overhang structure form a laminate constituted of a first metal layer (top bus electrode), a second metal layer, and an insulator in the order from the top bus electrode side.

9. The display device according to claim 7, wherein the top bus electrode and the overhang structure form a laminate constituted of a first metal layer (top bus electrode), an insulator, and a second metal layer in the order from the top bus electrode side.

10. The display device according to claim 7, wherein the top bus electrode and the overhang structure form a laminate constituted of a first metal layer (top bus electrode), a first insulator, and second insulator in the order from the top bus electrode side.

11. The display device according to claim 7, wherein combination of a material used for the top bus electrode that is etched slowest and a material used for the film of the overhang laminate film disposed on the side of the top bus electrode that is etched fastest with the same etchant is employed for the top bus electrode and the overhang structure.

12. The display device according to claim 7, wherein the top bus electrode and the overhang structure are formed of combination of materials that are etched selectively.

* * * * *